(12) United States Patent
Suzuki et al.

(10) Patent No.: US 11,570,206 B2
(45) Date of Patent: Jan. 31, 2023

(54) CONTROL SYSTEM, CONTROL DETERMINATION DEVICE, AND CONTROL METHOD

(71) Applicant: Nippon Telegraph and Telephone Corporation, Tokyo (JP)

(72) Inventors: Hiroshi Suzuki, Musashino (JP); Yuhei Hayashi, Musashino (JP); Takeaki Nishioka, Musashino (JP); Katsuhiko Sakai, Musashino (JP); Ichiro Kudo, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 247 days.

(21) Appl. No.: 16/965,091

(22) PCT Filed: Feb. 4, 2019

(86) PCT No.: PCT/JP2019/003925
§ 371 (c)(1),
(2) Date: Jul. 27, 2020

(87) PCT Pub. No.: WO2019/151523
PCT Pub. Date: Aug. 8, 2019

(65) Prior Publication Data
US 2021/0029160 A1    Jan. 28, 2021

(30) Foreign Application Priority Data

Feb. 5, 2018  (JP) .............................. JP2018-018152

(51) Int. Cl.
*H04L 9/40*  (2022.01)

(52) U.S. Cl.
CPC ...... *H04L 63/1458* (2013.01); *H04L 63/0236* (2013.01); *H04L 63/0281* (2013.01);
(Continued)

(58) Field of Classification Search
CPC ............ H04L 63/1458; H04L 63/0236; H04L 63/0281; H04L 63/1416; H04L 63/1425; H04L 2463/142; H04L 12/70; H04L 29/06
See application file for complete search history.

(56) References Cited

U.S. PATENT DOCUMENTS

| 8,230,505 B1 * | 7/2012 | Ahrens | H04L 63/168 |
| | | | 705/5 |
| 8,949,459 B1 * | 2/2015 | Scholl | H04L 45/04 |
| | | | 709/239 |

(Continued)

OTHER PUBLICATIONS

Suzuki et al., "Enhancing the Applicability of Blackhole Routing by Extending BGP Flowspec," Collection of Lectures at the 2017 Communications Society Meeting of the Institute of Electronics, Information and Communication Engineers 2, Sep. 15, 2017, 3 pages (with Non-Official Translation).

(Continued)

*Primary Examiner* — Techane Gergiso
(74) *Attorney, Agent, or Firm* — Fish & Richardson P.C.

(57) ABSTRACT

A handling apparatus (14a) handles a server attack taking place on a network (1Na) or handles a server attack as requested by a security system provided on another network. In accordance with a determination that it is not possible to handle the server attack by the handling apparatus (14a), the control determination apparatus (12a) makes a request to another security system (1Sb) capable of handling the server attack to handle the server attack. A centralized control apparatus (11) determines whether the server attack taking place on the network (1Na) can be handled on another network.

8 Claims, 25 Drawing Sheets

(52) U.S. Cl.
CPC ...... *H04L 63/1416* (2013.01); *H04L 63/1425* (2013.01); *H04L 2463/142* (2013.01)

(56) References Cited

U.S. PATENT DOCUMENTS

| | | | | |
|---|---|---|---|---|
| 2008/0263363 | A1* | 10/2008 | Jueneman | H04W 12/06 713/184 |
| 2012/0216282 | A1* | 8/2012 | Pappu | H04L 63/1408 726/23 |
| 2013/0333029 | A1* | 12/2013 | Chesla | H04L 41/122 726/22 |
| 2018/0219912 | A1* | 8/2018 | Maslak | H04L 63/0281 |

OTHER PUBLICATIONS

Wikepedia.org, [online], "Network Security," May 26, 2017, retrieved on Jan. 22, 2018, retrieved from URL<https://ja.wikipedia.org/w/index.php?tide=networksecurity&oldid=64243922>, 9 pages (with Machine Translation).

\* cited by examiner

CONTROL SYSTEM, CONTROL DETERMINATION DEVICE, AND CONTROL METHOD

CROSS-REFERENCE TO RELATED APPLICATIONS

This application is a National Stage application under 35 U.S.C. § 371 of International Application No. PCT/JP2019/003925, having an International Filing Date of Feb. 4, 2019, which claims priority to Japanese Application Serial No. 2018-018152, filed on Feb. 5, 2018. The disclosure of the prior application is considered part of the disclosure of this application, and is incorporated in its entirety into this application.

TECHNICAL FIELD

The present invention relates to a control system, a control determination apparatus, and a control method.

BACKGROUND ART

In the related art, network providers handle server attacks taking place on networks that they administer using security systems with functions of intrusion detection systems (IDS)/intrusion prevention systems (IPS), blocking of distributed denial of service (DDoS) attacks, and the like.

CITATION LIST

NPL 1: Wikipedia, "ネットワーク・セキュリティ (Network Security)" [online], [found on Jan. 22, 2018], Internet (https://ja.wikipedia.org/wiki/%E3%83%8D%E3%83%83%E3%83%88%E3%83%AF%E3%83%BC%E3%82%AF%E3%83%BB%E3%82%BB%E3%82%AD%E3%83%A5%E3%83%AA%E3%83%86%E3%82%A3)

SUMMARY OF THE INVENTION

Technical Problem

However, techniques of the related art have a problem that there may be limitations on a method of handling server attacks that can be performed on a network. For example, if each network provider uses only a single type of security system, it is believed that a server attack that cannot be handled by that security system may not be handled.

Means for Solving the Problem

In order to solve the above-described problem and achieve an objective, a control system of the present invention is a control system including a plurality of networks, in which a first security system provided on a first network among the plurality of networks includes a handling unit configured to handle a server attack taking place on the first network or handle a server attack, the handling being requested by a security system provided on another network among the plurality of networks, a determination unit configured to determine whether handling of a first server attack taking place on the first network is possible for the handling unit, and a request unit configured to, in accordance with a determination of the determination unit that handling of the first server attack is not possible for the handling unit, make a request to another security system capable of handling the first server attack to handle the first server attack.

Effects of the Invention

According to the present invention, a method of handling server attacks that can be performed on a network can be reinforced.

DESCRIPTION OF EMBODIMENTS

Embodiments of a control system, a control determination apparatus, and a control method according to the present application will be described below in detail with reference to the drawings. Note that the present invention is not limited to the embodiments described below.

Configuration of First Embodiment

Figure 1:
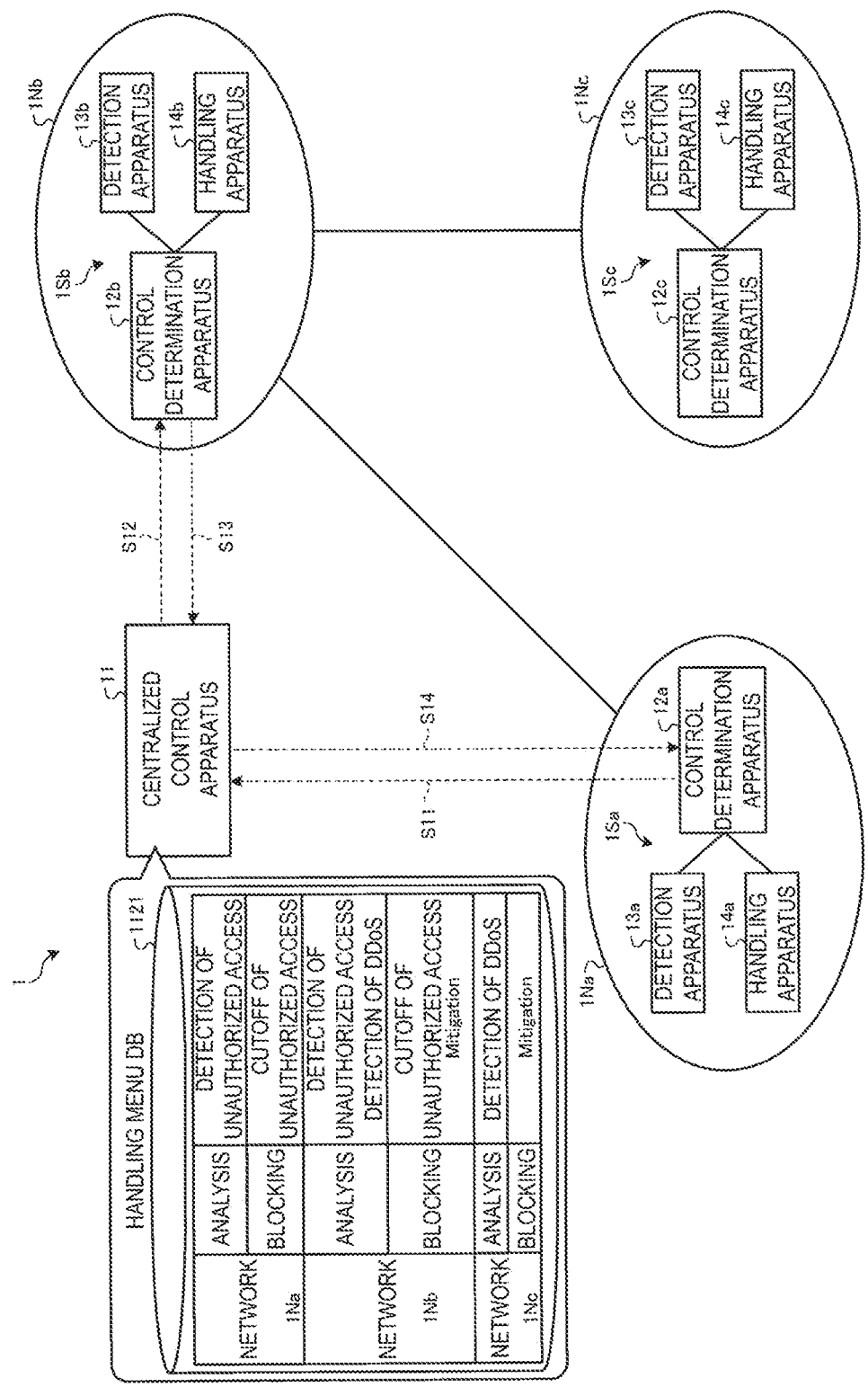
FIG. 1 is a diagram illustrating a configuration example of a control system according to a first embodiment.

First, a configuration of a control system according to a first embodiment will be described using FIG. 1. FIG. 1 is a diagram illustrating a configuration example of a control system according to the first embodiment. As illustrated in FIG. 1, the control system 1 includes a centralized control apparatus 11, a security system 1Sa provided on a network 1Na, a security system 1Sb provided on a network 1Nb, and a security system 1Sc provided on a network 1Nc. For example, the network 1Na, the network 1Nb, and the network 1Nc are networks managed by different network providers.

In the following description, the network 1Na, the network 1Nb, and the network 1Nc may be referred to as networks 1N without distinction. In addition, in the following description, the security system 1Sa, the security system 1Sb, and the security system 1Sc may be referred to as security systems 1S without distinction.

The security system 1Sa includes a control determination apparatus 12a, a detection apparatus 13a, and a handling apparatus 14a. In addition, the security system 1Sb includes a control determination apparatus 12b, a detection apparatus 13b, and a handling apparatus 14b. In addition, the security system 1Sc includes a control determination apparatus 12c, a detection apparatus 13c, and a handling apparatus 14c.

The control determination apparatus 12a, the control determination apparatus 12b, and the control determination apparatus 12c all have similar functions. In the following description, the control determination apparatus 12a, the control determination apparatus 12b, and the control determination apparatus 12c may be referred to as control determination apparatuses 12 without distinction. In addition, the detection apparatus 13a, the detection apparatus 13b, and the detection apparatus 13c all have similar functions. In the following description, the detection apparatus 13a, the detection apparatus 13b, and the detection apparatus 13c may be referred to as detection apparatuses 13 without distinction. The detection apparatus 13 uses an IDS or the like to detect server attacks taking place in the network 1N. In addition, the handling apparatus 14a, the handling apparatus 14b, and the handling apparatus 14c all have similar functions. In the following description, the handling apparatus 14a, the handling apparatus 14b, and the handling apparatus 14c may be referred to as handling apparatuses 14 without distinction. The handling apparatus 14 uses an IPS, or the like to analyze server attacks and block server attacks.

The handling apparatus 14 handles a server attack taking place on the network 1N or handles a server attack as requested by the security system 1S provided on another network 1N among the plurality of networks 1N. However, as will be described below, the handling apparatus 14a, the handling apparatus 14b, and the handling apparatus 14c differ in feasible method of handling server attacks.

The centralized control apparatus 11 has a handling menu DB 1121. The handling menu DB 1121 stores feasible methods of handling server attacks for each of the handling apparatuses 14 of the security systems 1S provided on the networks 1N.

For example, as illustrated in FIG. 1, the handling apparatus 14a of the security system 1Sa provided on the network 1Na can perform analysis on the basis of "detection of unauthorized access" and blocking on the basis of "cutoff of unauthorized access." In addition, for example, the handling apparatus 14b of the security system 1Sb provided on the network 1Nb can perform analysis on the basis of "detection of unauthorized access" or "detection of DDoS" and blocking on the basis of "cutoff of unauthorized access" or "Mitigation."

Here, an overview of processing of the control system 1 will be described. First, the detection apparatus 13a of the security system 1Sa detects a server attack on the network 1Na. Then, in accordance with a determination of the control determination apparatus 12a that the handling apparatus 14a is not able to handle the server attack, the control determination apparatus 12a makes a request to the centralized control apparatus 11 for handling (step S11).

The centralized control apparatus 11 makes reference to the handling menu DB 1121 to extract the security system 1Sb capable of handling the server attack as requested by the security system 1Sa. Then, the centralized control apparatus 11 makes a request to the security system 1Sb to handle the server attack (step S12).

The security system 1Sb handles the server attack and notifies the centralized control apparatus 11 of the result of the handling (step S13). Furthermore, the centralized control apparatus 11 notifies the control determination apparatus 12a of the result of the handling (step S14).

Figure 2:
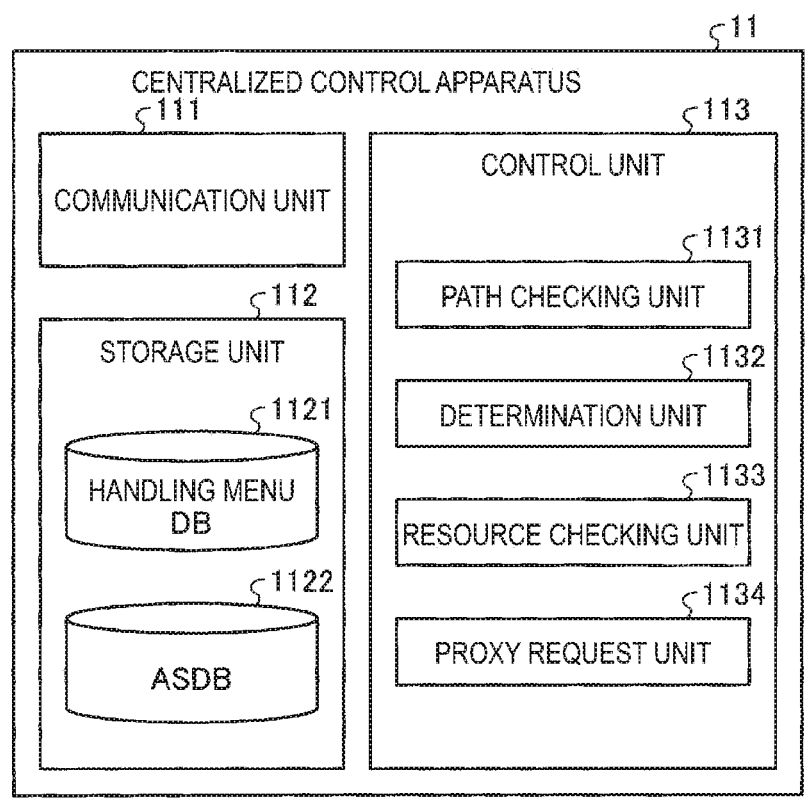
FIG. 2 is a diagram illustrating a configuration example of a centralized control apparatus according to the first embodiment.

A configuration of the centralized control apparatus 11 will be described using FIG. 2. FIG. 2 is a diagram illustrating a configuration example of the centralized control apparatus according to the first embodiment. As illustrated in FIG. 2, the centralized control apparatus 11 includes a communication unit 111, a storage unit 112, and a control unit 113.

The communication unit 111 performs data communication with other apparatuses via a network. For example, the communication unit 111 is a network interface card (NIC). For example, the communication unit 111 performs data communication with the control determination apparatus 12a, the control determination apparatus 12b, and the control determination apparatus 12c.

The storage unit 112 is a storage apparatus such as a hard disk drive (HDD), a solid state drive (SSD), an optical disc, or the like. Note that the storage unit 112 may be a semiconductor memory capable of rewriting data such as a random access memory (RAM), a flash memory, a non-volatile static random access memory (NVSRAM), or the like. The storage unit 112 stores an operating system (OS)

and various programs executed by the centralized control apparatus 11. Furthermore, the storage unit 112 stores various kinds of information to be used in the execution of the programs. For example, the storage unit 112 stores the handling menu DB 1121 and an ASDB 1122.

The handling menu DB 1121 stores feasible methods of handling server attacks for each of the handling apparatuses 14 of the security systems 1S provided on the networks 1N, as described with reference to FIG. 1. A communication path between each of the networks 1N is stored in the ASDB 1122. Here, the network 1Na, the network 1Nb, and the network 1Nc are assumed to belong to an autonomous system (AS) together.

The control unit 113 controls the centralized control apparatus 11 as a whole. The control unit 113 may be, for example, an electronic circuit such as a central processing unit (CPU) or a micro-processing unit (MPU), or an integrated circuit such as an application specific integrated circuit (ASIC) or a field programmable gate array (FPGA). In addition, the control unit 113 has an internal memory for storing programs defining various processing procedure sand control data, and performs processes using the internal memory. Furthermore, the control unit 113 functions as various processing units by operating various programs. For example, the control unit 113 includes a path checking unit 1131, a determination unit 1132, a resource checking unit 1133, and a proxy request unit 1134.

The path checking unit 1131 makes reference to the ASDB 1122 to check a communication path to each of the networks 1N. The determination unit 1132 makes reference to the handling menu DB 1121 to determine whether there is a security system 1S that can perform a requested handling of a server attack.

The resource checking unit 1133 checks resources of the apparatuses of the security systems 1S that request handling of server attacks. Specifically, the resource checking unit 1133 makes a request to the security system 1S for checking whether resources of the handling apparatus 14 are available and receives a notification of the result of the checking from the security system 1S.

The proxy request unit 1134 receives a request from a request unit 1233 of the control determination apparatus 12, which will be described later, makes reference to the storage unit 112, identifies another security system 1S capable of handling a first server attack, and makes a request to the identify security system 1S to handle the first server attack.

Specifically, in accordance with a determination of the determination unit 1132 that there is a security system 1S that can handle the server attack, when the path checking unit 1131 has checked a communication path to the security system 1S and the resource checking unit 1133 has checked that resources of the handling apparatus 14 of the security system 1S are available, the proxy request unit 1134 makes a request to the security system 1S to handle the server attack. For example, in the example of FIG. 1, the proxy request unit 1134 makes a request to the control determination apparatus 12b to handle the server attack as a proxy for the control determination apparatus 12a.

Figure 3:
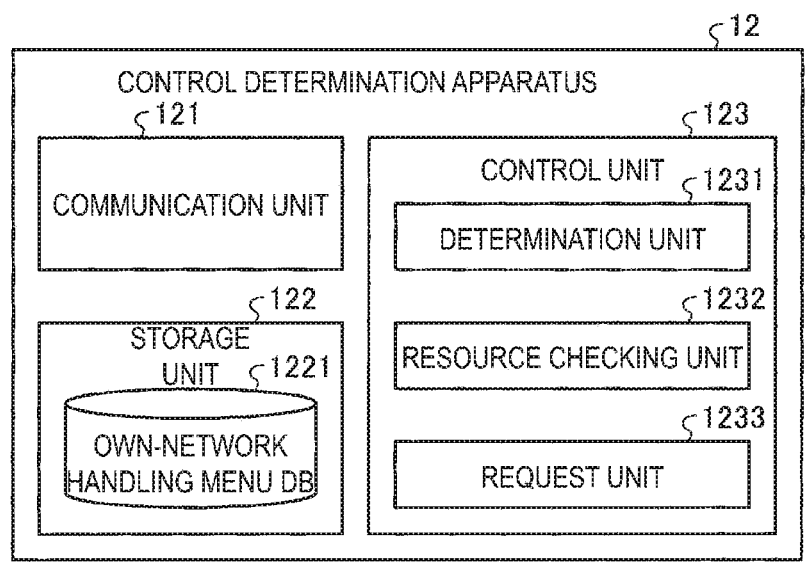
FIG. 3 is a diagram illustrating a configuration example of a control determination apparatus according to the first embodiment.

A configuration of the control determination apparatus 12 will be described using FIG. 3. FIG. 3 is a diagram illustrating a configuration example of the control determination apparatus according to the first embodiment. As illustrated in FIG. 3, the control determination apparatus 12 includes a communication unit 121, a storage unit 122, and a control unit 123.

The communication unit 121 performs data communication with other apparatuses via a network. For example, the communication unit 121 is an NIC. For example, the communication unit 121 performs data communication with the centralized control apparatus 11.

The storage unit 122 is a storage apparatus such as an HDD, an SSD, or an optical disc. Note that the storage unit 122 may be a semiconductor memory capable of rewriting data such as a RAM, a flash memory, or an NVSRAM. The storage unit 122 stores an OS and various programs executed by the control determination apparatus 12. Furthermore, the storage unit 122 stores various kinds of information to be used in the execution of the programs. For example, the storage unit 122 stores the own-network handling menu DB 1221.

The own-network handling menu DB 1221 stores handling methods that can be performed by the handling apparatus 14 of the security system 1S itself on server attacks. For example, the own-network handling menu DB 1221 of the control determination apparatus 12a stores the same data as that corresponding to the network 1Na of the handling menu DB 1121 illustrated in FIG. 1.

The control unit 123 controls the control determination apparatus 12 as a whole. The control unit 123 is, for example, an electronic circuit such as a CPU or an MPU or an integrated circuit such as an ASIC or an FPGA. In addition, the control unit 123 has an internal memory for storing programs defining various processing procedures and control data, and performs processes using the internal memory. Furthermore, the control unit 123 functions as various processing units by operating various programs. For example, the control unit 123 includes a determination unit 1231, a resource checking unit 1232, and a request unit 1233.

The determination unit 1231 determines whether the handling apparatus 14 can handle the first server attack taking place on the network 1N. The determination unit 1231 makes references to the own-network handling menu DB 1221 to determine whether the handling apparatus 14 of the security system 1S itself can handle a detected server attack. The resource checking unit 1232 checks the availability of resources of the handling apparatus 14 in performing the handling of the server attack.

In accordance with a determination of the determination unit 1231 that it is not possible for the handling apparatus 14 to handle the first server attack, the request unit 1233 makes a request to another security system 1S capable of handling the first server attack to handle the first server attack. In the first embodiment, the request unit 1233 makes a request to the other security system 1S via the centralized control apparatus 11. For example, in the example of FIG. 1, the proxy request unit 1134 makes a request to the control determination apparatus 12b for handling of the server attack as a proxy for the control determination apparatus 12a.

On the other hand, in accordance with a determination of the determination unit 1231 that the detected server attack can be handled by the handling apparatus 14 of the security system 1S itself, when the resource checking unit 1232 has checked that the resources of the handling apparatus 14 are available, the request unit 1233 makes a request to the handling apparatus 14 to handle the server attack.

Process of First Embodiment

Figure 4:
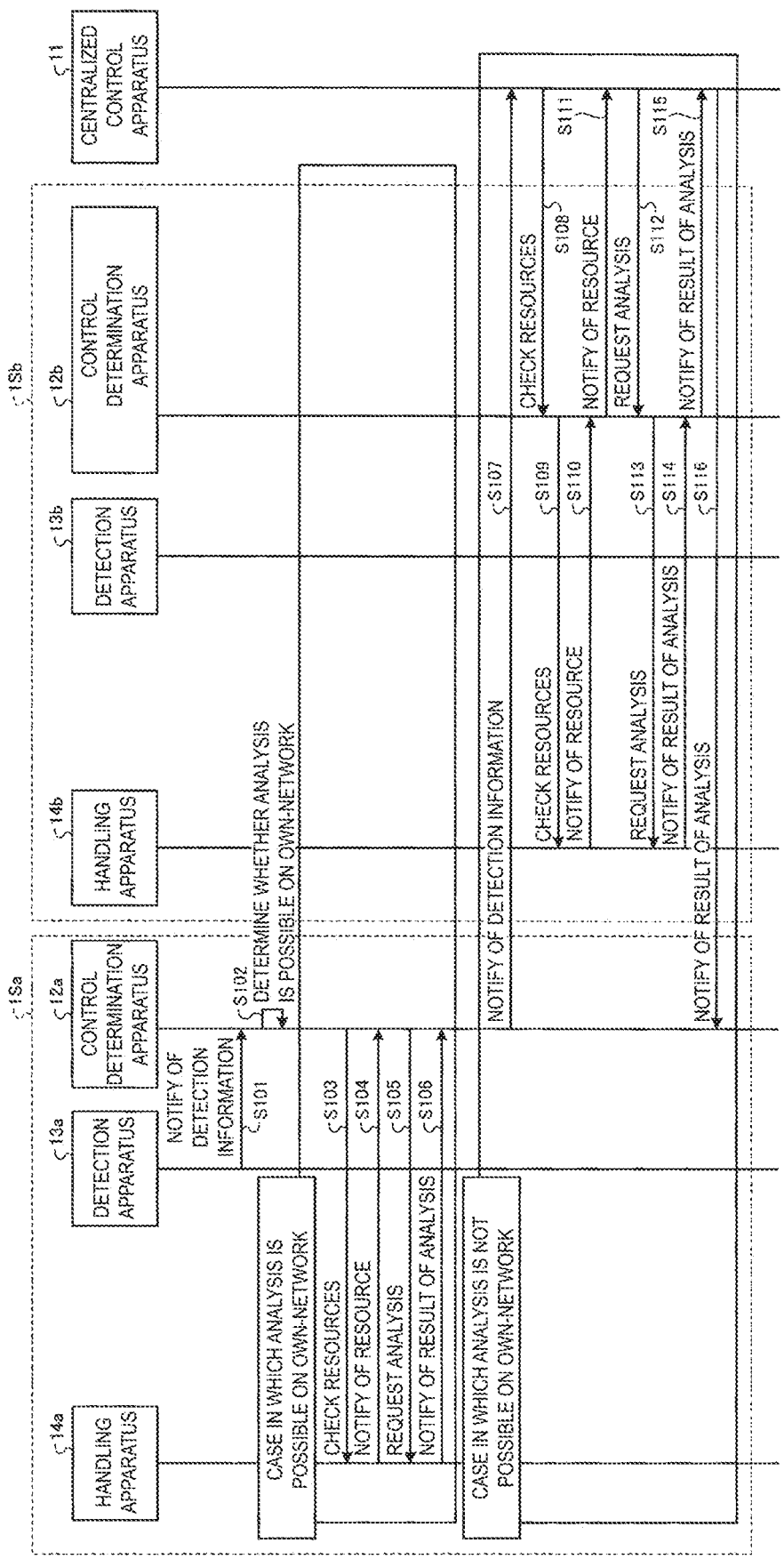
FIG. 4 is a sequence diagram illustrating a process sequence of the control system according to the first embodiment.
Figure 5:
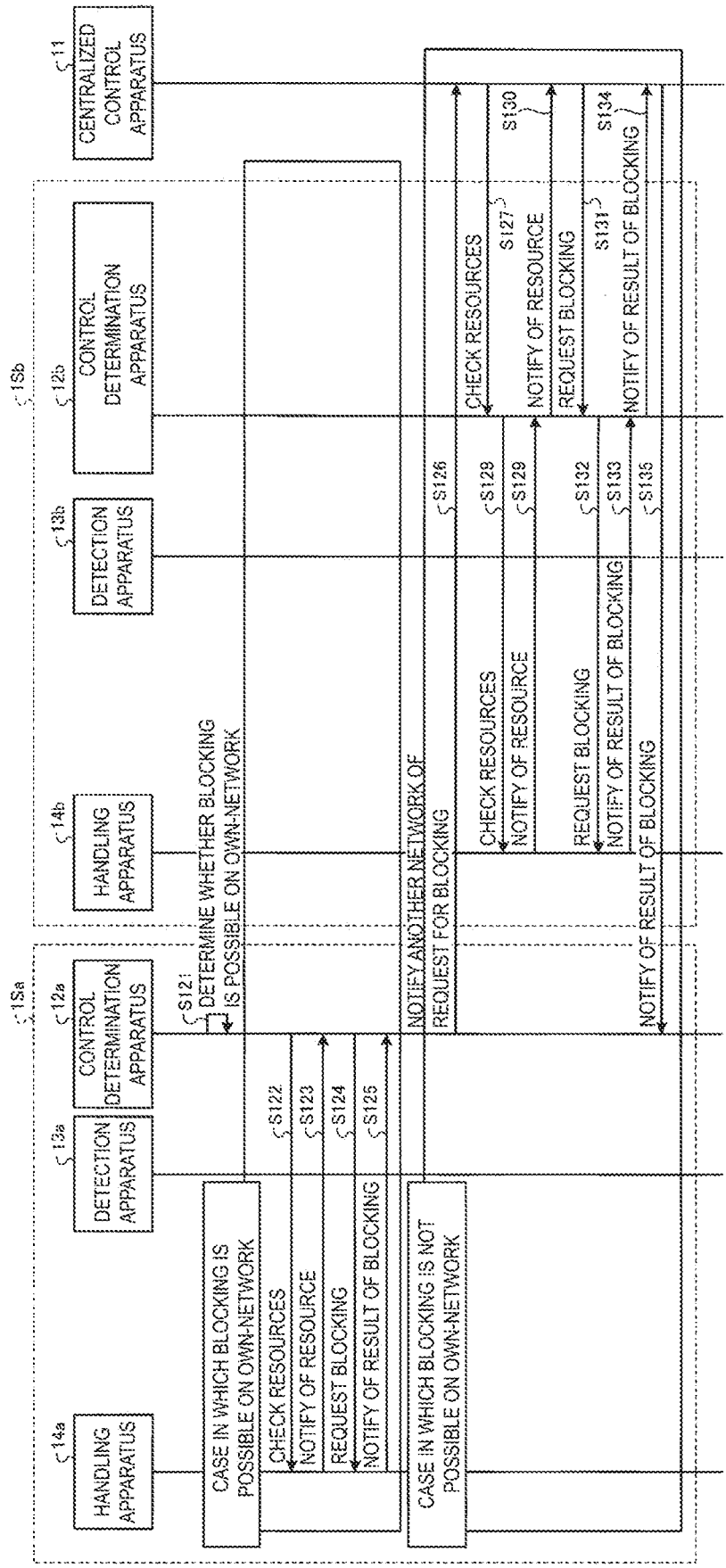
FIG. 5 is a sequence diagram illustrating a process sequence of the control system according to the first embodiment.

Overall process sequences of the control system 1 of the present embodiment will be described using FIG. 4 and FIG. 5. FIG. 4 and FIG. 5 are sequence diagrams illustrating the process sequences of the control system according to the first embodiment.

Analysis Process (Overall)

First, an example of a case in which analysis of a server attack taking place on the network 1Na is performed will be described using FIG. 4. As illustrated in FIG. 4, when a server attack taking place on the network 1Na is detected, the detection apparatus 13a notifies the control determination apparatus 12a of the detection information (step S101). Then, the control determination apparatus 12a determines whether the server attack is analyzable on the network 1Na on the basis of the detection information (step S102).

If the server attack is analyzable on the network 1Na, the control determination apparatus 12a checks resources of the handling apparatus 14a (step S103), and after a notification of the resources is received from the handling apparatus 14a (step S104), the control determination apparatus 12a makes a request to the handling apparatus 14a for analysis of the server attack (step S105), and then receives a notification of the result of analysis from the handling apparatus 14a (step S106).

On the other hand, if the server attack is not analyzable on the network 1Na, the control determination apparatus 12a notifies the centralized control apparatus 11 of the request to analyze the server attack (step S107). Here, the centralized control apparatus 11 makes reference to the storage unit of the centralized control apparatus 11 to extract the network 1Nb provided with the handling apparatus 14b capable of the requested analysis of the server attack.

The centralized control apparatus 11 instructs the control determination apparatus 12b to check resources of the handling apparatus 14b (step S108). The control determination apparatus 12b checks resources of the handling apparatus 14b (step S109), and notifies the centralized control apparatus 1 (step S111) of a notification of the resources received from the handling apparatus 14a (step S110).

Then, the centralized control apparatus 11 makes a request to the control determination apparatus 12b to analyze the server attack (step S112). Then, the control determination apparatus 12b makes a request to the handling apparatus 14b to analyze the server attack (step S113), receives a notification of the result of analysis from the handling apparatus 14b (step S114), and notifies the centralized control apparatus 11 of the received result of analysis (step S115). Furthermore, the centralized control apparatus 11 notifies the control determination apparatus 12a of the result of analysis of the server attack (step S116).

Blocking Process (Overall)

Next, an example of a case in which a server attack taking place on the network 1Na is blocked will be described using FIG. 5. As illustrated in FIG. 5, after the analysis of the server attack is finished, the control determination apparatus 12a determines whether the server attack can be blocked on the network 1Na on the basis of the result of analysis (step S121).

If the server attack can be blocked on the network 1Na, the control determination apparatus 12a checks resources of the handling apparatus 14a (step S122), and after a notification of the resources is received from the handling apparatus 14a (step S123), the control determination apparatus 12a makes a request to the handling apparatus 14a to block the server attack (step S124), and then receives a notification of the result of blocking from the handling apparatus 14a (step S125).

On the other hand, if it is not possible to block the server attack on the network 1Na, the control determination apparatus 12a notifies the centralized control apparatus 11 of the request to block the server attack (step S126). Here, the centralized control apparatus 11 makes reference to the storage unit of the centralized control apparatus 11 to extract the network 1Nb provided with the handling apparatus 14b capable of the requested blocking of the server attack.

The centralized control apparatus 11 instructs the control determination apparatus 12b to check resources of the handling apparatus 14b (step S127). The control determination apparatus 12b checks the resources of the handling apparatus 14b (step S128) and notifies the centralized control apparatus 11 (step S130) of a notification of the resources received from the handling apparatus 14a (step S129).

Then, the centralized control apparatus 11 makes a request to the control determination apparatus 12b to block the server attack (step S131). Then, the control determination apparatus 12b makes a request to the handling apparatus 14b to block the server attack (step S132), receives a notification of the result of blocking from the handling apparatus 14b (step S133), and notifies the centralized control apparatus 11 of the received result of blocking (step S134). Furthermore, the centralized control apparatus 11 notifies the control determination apparatus 12a of the result of the blocking of the server attack (step S135).

Figure 6:
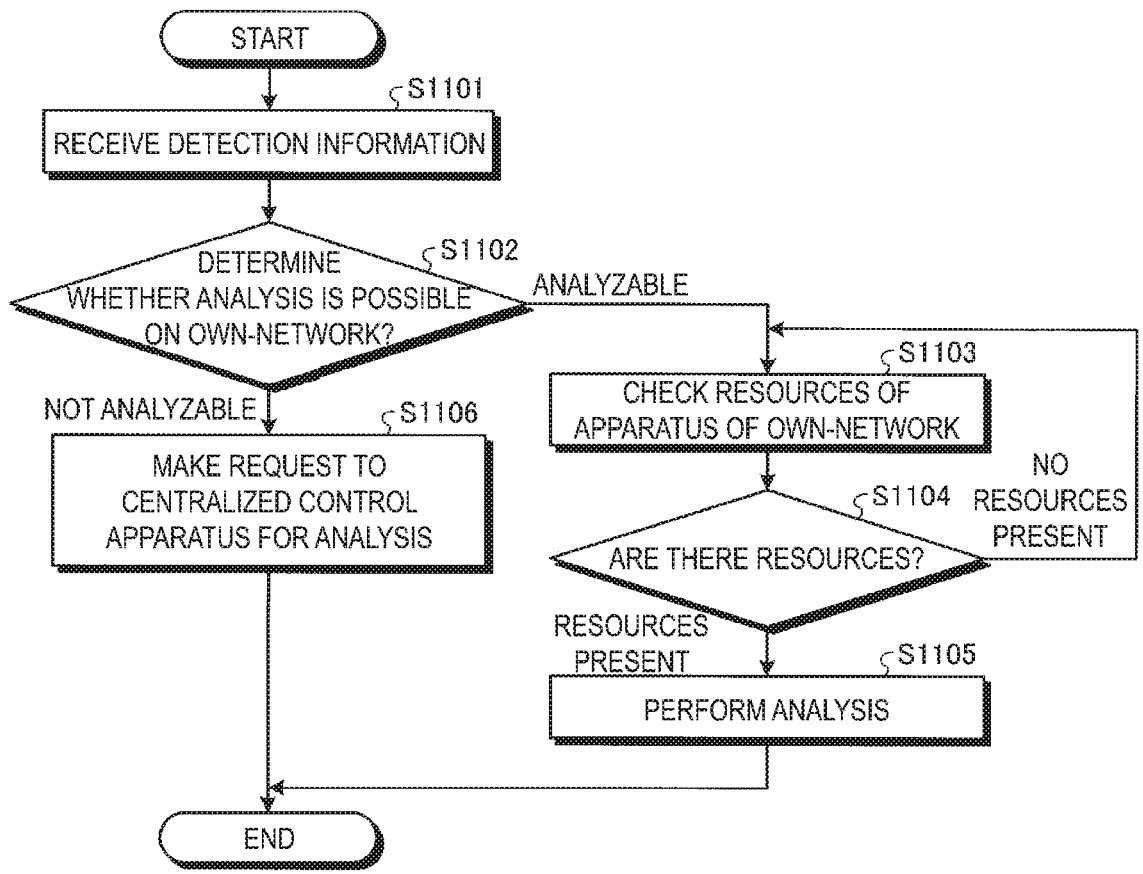
FIG. 6 is a flowchart showing an analysis process sequence of the control determination apparatus according to the first embodiment.
Figure 7:
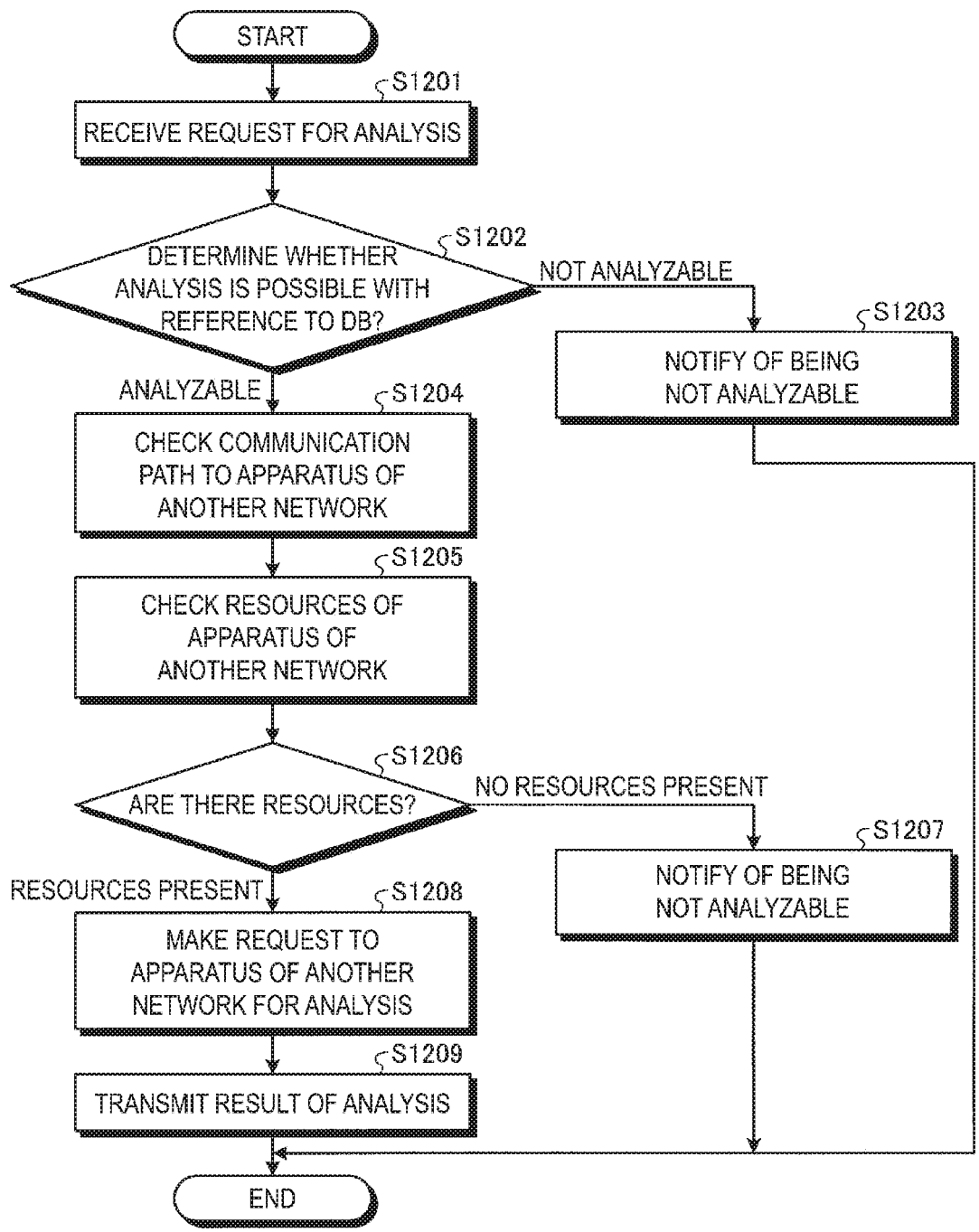
FIG. 7 is a flowchart showing an analysis process sequence of the centralized control apparatus according to the first embodiment.
Figure 8:
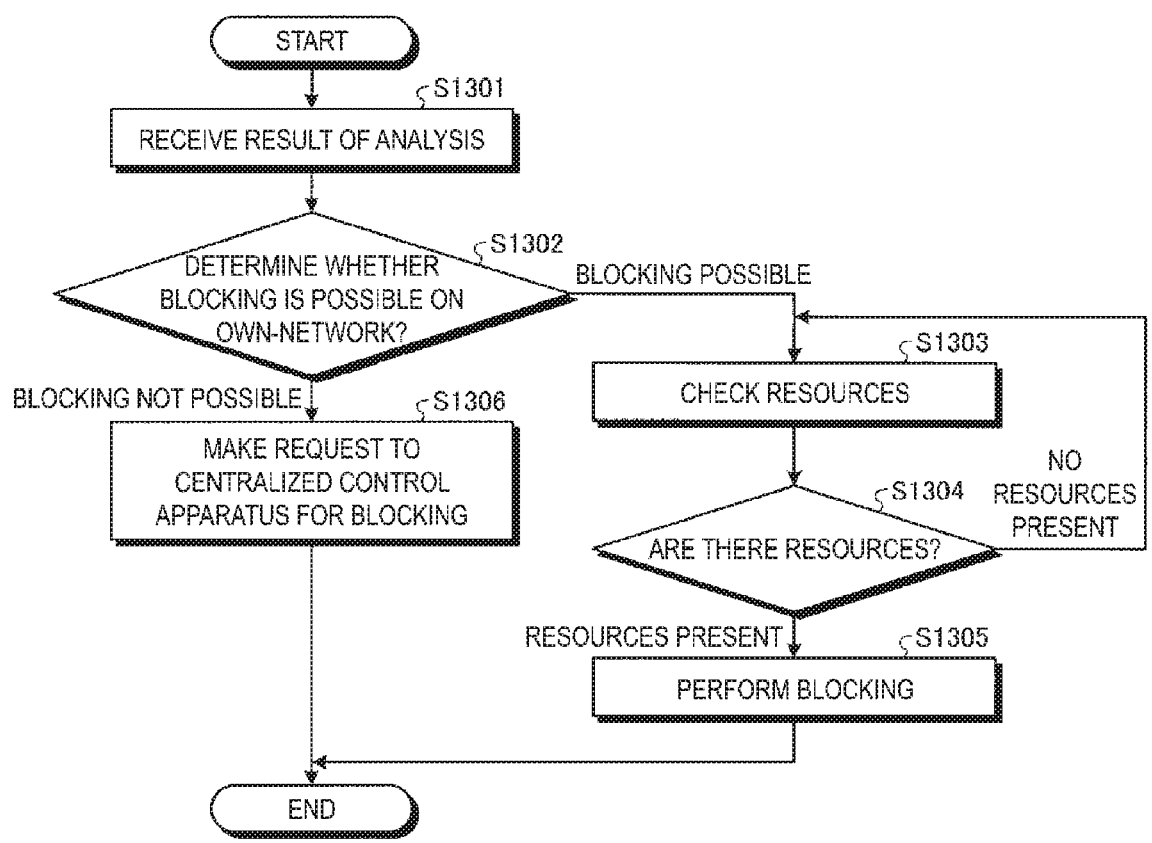
FIG. 8 is a flowchart showing a blocking process sequence of the control determination apparatus according to the first embodiment.
Figure 9:
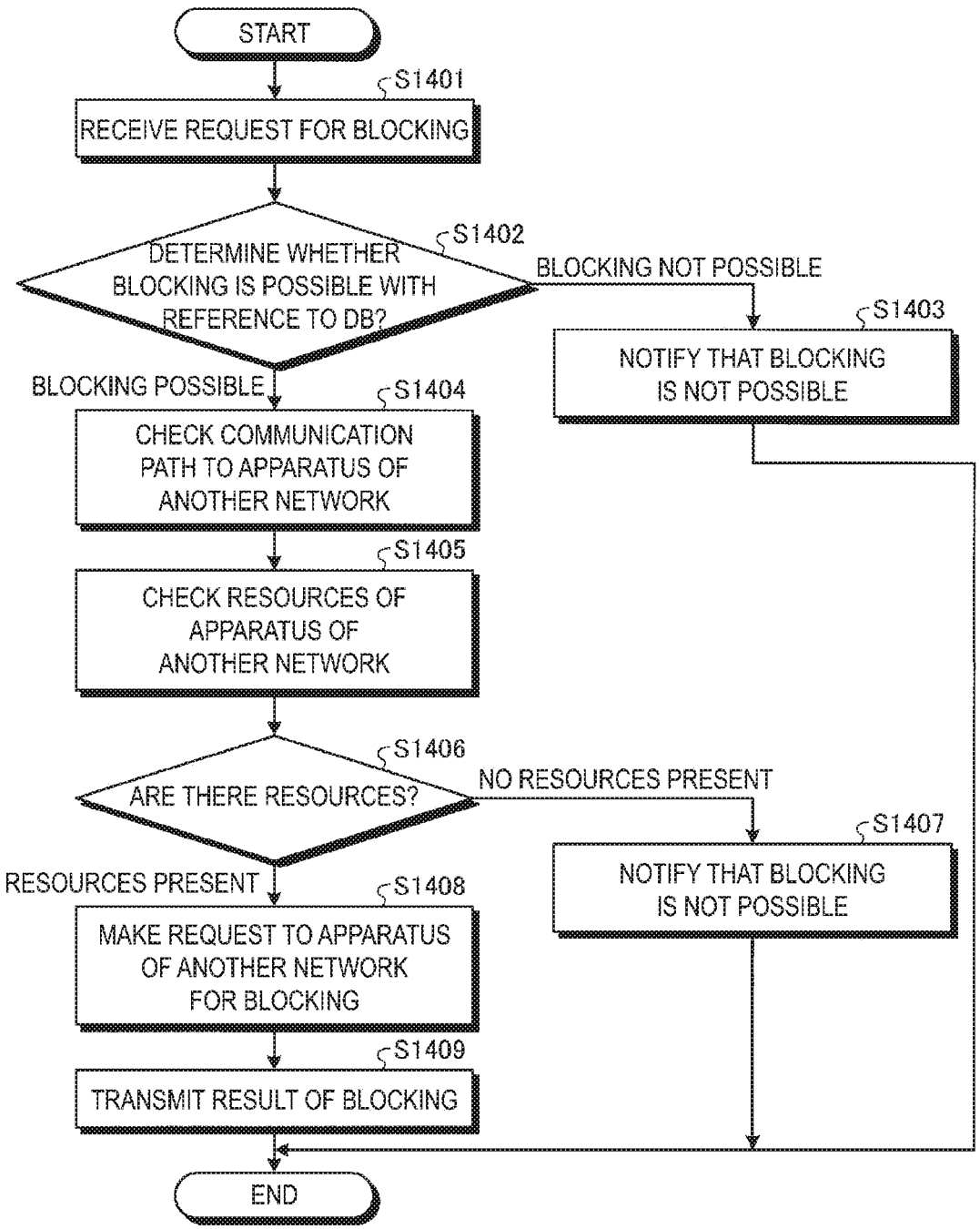
FIG. 9 is a flowchart showing a blocking process sequence of the centralized control apparatus according to the first embodiment.

Next, flowcharts of processes of each of the apparatuses according to the present embodiment will be described using FIG. 6 to FIG. 9. FIG. 6 is a flowchart showing an analysis process of the control determination apparatus according to the first embodiment. FIG. 7 is a flowchart showing an analysis process of the centralized control apparatus according to the first embodiment. FIG. 8 is a flowchart showing a blocking process of the control determination apparatus according to the first embodiment. FIG. 9 is a flowchart showing a blocking process of the centralized control apparatus according to the first embodiment.

Analysis Process (of Each Apparatus)

As illustrated in FIG. 6, the control determination apparatus 12a receives detection information on a server attack (step S1101). Next, the control determination apparatus 12a determines whether the server attack is analyzable on the network 1Na on the basis of the detection information (step S1102).

If the server attack is analyzable on the network 1Na (step S1102; analyzable), the control determination apparatus 12a checks resources of the handling apparatus 14a of the network 1Na (step S1103). If there are no resources (step S1104; no resources present), the control determination apparatus 12a checks resources again after a predetermined period of time elapses. In addition, if there are resources (step S1104; resources present), the control determination apparatus 12a causes the handling apparatus 14a to perform analysis (step S105).

In addition, if the server attack is not analyzable on the network 1Na (step S1102: not analyzable), the control determination apparatus 12 makes a request to the centralized control apparatus 11 to analyze the server attack (step S1106).

As illustrated in FIG. 7, when a request for analysis of the server attack is received (step S1201), the centralized control apparatus 11 makes reference to a DB stored in the centralized control apparatus 11 to determine whether the server attack is analyzable (step S1202). If the server attack is not analyzable (step S1202; not analyzable), the centralized control apparatus 11 notifies the control determination apparatus 12a indicating that the server attack is not analyzable and terminates the process (step S1203).

If the server attack is analyzable (step S1202; analyzable), the centralized control apparatus 11 checks a communication path to the network 1Nb provided with the handling apparatus 14*b* that can perform analysis (step S1204) and checks resources of the handling apparatus 14*b* (step S1205).

If there are no resources of the handling apparatus 14*b* (step S1206; no resources present), the centralized control apparatus 11 notifies the control determination apparatus 12*a* indicating that the server attack is not analyzable and terminates the process (step S1207).

On the other hand, if there are resources of the handling apparatus 14*b* (step S1206, resources present), the centralized control apparatus 11 makes a request to the control determination apparatus 12*b* to analyze the server attack (step S1208) and transmits the result of analysis to the control determination apparatus 12*a* after analysis is completed (step S1209).

Blocking Process (of Each Apparatus)

As illustrated in FIG. 8, the control determination apparatus 12*a* receives the result of analysis of the server attack (step S1301). Next, the control determination apparatus 12*a* determines whether the server attack can be blocked on the network 1Na on the basis of the result of analysis (step S1302).

If the server attack can be blocked on the network 1Na (step S1302; blocking possible), the control determination apparatus 12*a* checks resources of the handling apparatus 14*a* of the network 1Na (step S1303). If there are no resources (step S1304; no resources present), the control determination apparatus 12*a* checks resources again after a predetermined period of time elapses. In addition, if there is a resource (step S1304; resources present), the control determination apparatus 12*a* causes the handling apparatus 14*a* to perform blocking (step S1305).

In addition, if it is not possible to block the server attack on the network 1Na (step S1302; blocking not possible), the control determination apparatus 12 makes a request to the centralized control apparatus 11 to block the server attack (step S1306).

As illustrated in FIG. 9, when a request for blocking the server attack is received (step S1401), the centralized control apparatus 11 makes reference to the DB stored in the centralized control apparatus 11 to determine whether the server attack can be blocked (step S1402). If it is not possible to block the server attack (step S1402; blocking not possible), the centralized control apparatus 11 notifies the control determination apparatus 12*a* indicating that blocking is not possible and terminates the process (step S1403).

If the server attack can be blocked (step S1402; blocking possible), the centralized control apparatus 1I checks a communication path to the network 1Nb provided with the handling apparatus 14*b* that can perform blocking (step S1404) and checks resources of the handling apparatus 14*b* (step S1405).

If there are no resources of the handling apparatus 14*b* (step S1406; no resources present), the centralized control apparatus 11 notifies the control determination apparatus 12*a* indicating that blocking is not possible and terminates the process (step S1407).

On the other hand, if there are resources of the handling apparatus 14*b* (step S1406; resources present), the centralized control apparatus 11 makes a request to the control determination apparatus 12*b* to block the server attack (step S1408) and transmits the result of blocking to the control determination apparatus 12*a* after blocking is completed (step S1409).

Effect of First Embodiment

The handling apparatus 14 performs handling of a server attack taking place on the network 1N or requested handling of a server attack, the handling being requested by the security system 1S provided on another network 1N of the plurality of networks 1N. The determination unit 1231 determines whether the handling apparatus 14 can handle the first server attack taking place on the network 1N. In accordance with a determination of the determination unit 1231 that it is not possible for the handling apparatus 14 to handle the first server attack, the request unit 1233 makes a request to another security system 1S capable of handling the first server attack to handle the first server attack.

Thus, in the present embodiment, a request for handling can be made to the other security systems even if a server attack that cannot be handled by a single security system takes place. As a result, according to the present embodiment, a method of handling server attacks, the method to be performed on a network can be reinforced.

The storage unit 112 of the centralized control apparatus 11 stores a feasible method of handling a server attack for the control determination apparatus 12 provided on each of the plurality of networks 1N. The proxy request unit 1134 of the centralized control apparatus 11 receives a request from a request unit 1233, makes reference to the storage unit 112, identifies another security system 1S that can handle the first server attack, and makes a request to the identified security system 1S for handling of the first server attack.

As described above, in the present embodiment, the centralized control apparatus 11 stores the method of handling that can be performed by each security system and performs the process for requesting handling between the security systems as a proxy. Consequently, the usage and processing loads of the storage area of each security system can be reduced.

Second Embodiment

A second embodiment will be described. In the first embodiment, the centralized control apparatus 11 performs the process for requesting handling of server attacks as a proxy of each of the security systems In contrast, in the second embodiment, each security system performs process for requesting handling of server attacks directly.

Furthermore, a processing unit of the second embodiment in similar names to those of the processing unit of the first embodiment basically performs similar processes to the corresponding processing unit of the first embodiment. For example, a detection apparatus 23*a* of the second embodiment performs similar processes to those of the detection apparatus 13*a* of the first embodiment. In the following description, description of points in common between the first embodiment and the second embodiment will be appropriately omitted, and differences will be described in detail.

Configuration of Second Embodiment

Figure 10:
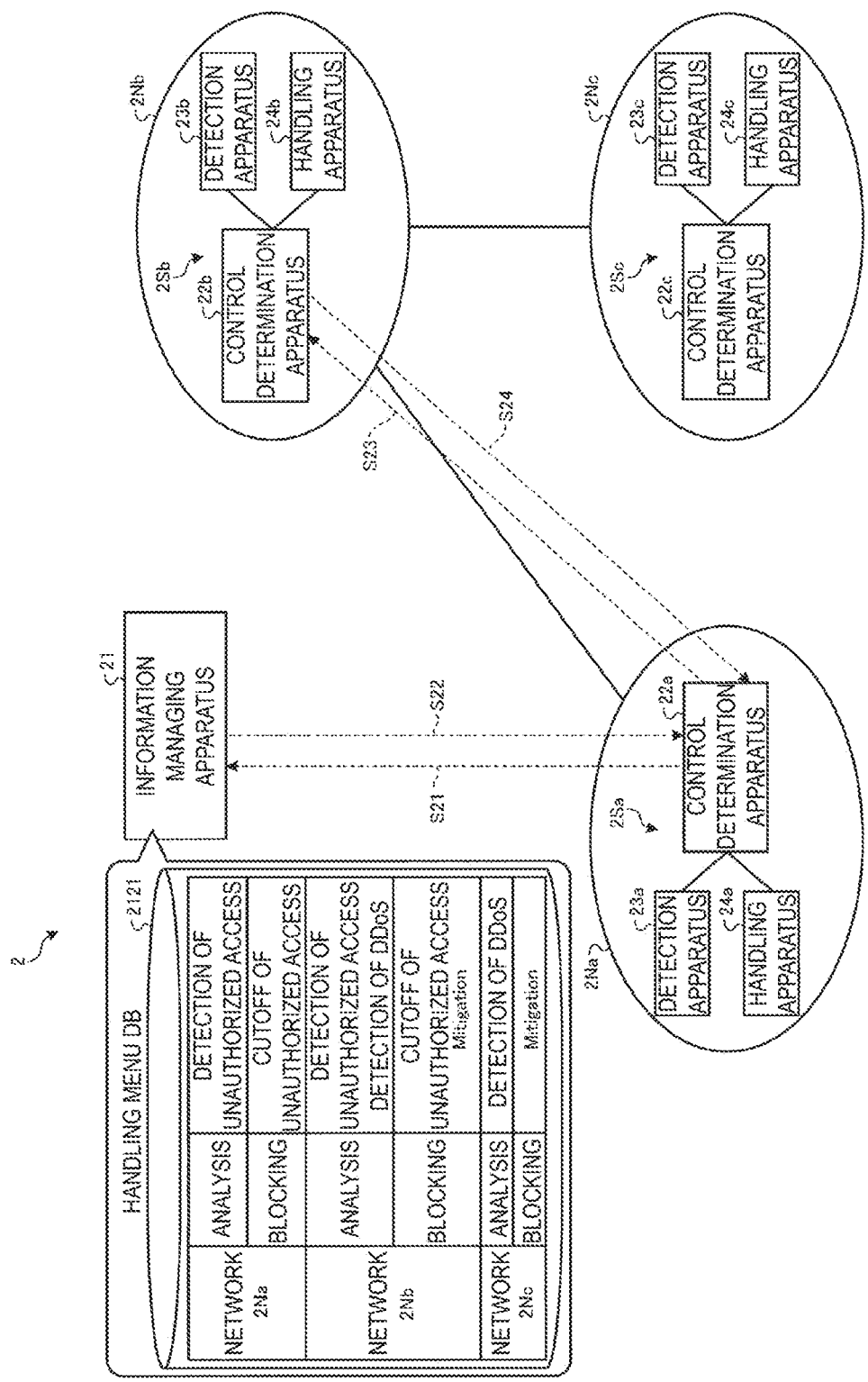
FIG. 10 is a diagram illustrating a configuration example of a control system according to a second embodiment.

First, a configuration of a control system according to the second embodiment will be described using FIG. 10. FIG. 10 is a diagram illustrating a configuration example of the control system according to the second embodiment. As illustrated in FIG. 10, the control system 2 includes an information managing apparatus 21, a security system 2Sa provided on a network 2Na, a security system 2Sb provided on a network 2Nb, and a security system 2Sc provided on a network 2Nc.

In the following description, the network 2Na, the network 2Nb, and the network 2Nc may be referred to as networks 2N without distinction. Also, in the following description, the security system 2Sa, the security system 2Sb, and the security system 2Sc may be referred to as security systems 2S without distinction.

The security system 2Sa includes a control determination apparatus 22a, a detection apparatus 23a, and a handling apparatus 24a. In addition, the security system 2Sb includes a control determination apparatus 22b, a detection apparatus 23b, and a handling apparatus 24b. In addition, the security system 2Sc includes a control determination apparatus 22c, a detection apparatus 23c, and a handling apparatus 24c.

The control determination apparatus 22a, the control determination apparatus 22b, and the control determination apparatus 22c all have similar functions. In the following description, the control determination apparatus 22a, the control determination apparatus 22b, and the control determination apparatus 22c may be referred to as control determination apparatuses 22 without distinction. In addition, the detection apparatus 23a, the detection apparatus 23b, and the detection apparatus 23c all have similar functions. In the following description, the detection apparatus 23a, the detection apparatus 23b, and the detection apparatus 23c may be referred to as detection apparatuses 23 without distinction. Also, the handling apparatus 24a, the handling apparatus 24b, and the handling apparatus 24c all have similar functions. In the following description, the handling apparatus 24a, the handling apparatus 24b, and the handling apparatus 24c may be referred to as handling apparatuses 24 without distinction.

The detection apparatuses 23 and the handling apparatuses 24 perform similar processes to those of the detection apparatus 13 and the handling apparatuses 14 of the first embodiment, respectively. Also, the handling apparatus 24a, the handling apparatus 24b, and the handling apparatus 24c are similar to those of the first embodiment in that the feasible methods of handling server attacks differ.

The information managing apparatus 21 has a handling menu DB 2121. Similarly to the handling menu DB 2121 of the first embodiment, the handling menu DB 2121 stores feasible methods of handling server attacks for each of the handling apparatuses 24 of the security systems 2S provided on the network 2N.

Here, an overview of processing of the control system 2 will be described. First, the detection apparatus 23a of the security system 2Sa detects a server attack on the network 2Na. Then, in accordance with a determination of the control determination apparatus 22a that the handling apparatus 24a is not able to handle the server attack, the control determination apparatus 22a makes a request to the information managing apparatus 21 for provision of information of the network 2N on which the server attack can be handled (step S21).

The information managing apparatus 21 makes reference to the handling menu DB 2121 to extract the security system 2Sb capable of handling the server attack, the handling requested by the security system 2Sa. Then, the information managing apparatus 21 notifies the control determination apparatus 22a that the security system 2Sb is capable of handling the server attack (step S22).

Then, the control determination apparatus 22a makes a request to the security system 2Sb to handle the server attack (step S23). The security system 2Sb handles the server attack and notifies the control determination apparatus 22a of the handling result (step S24).

Figure 11:
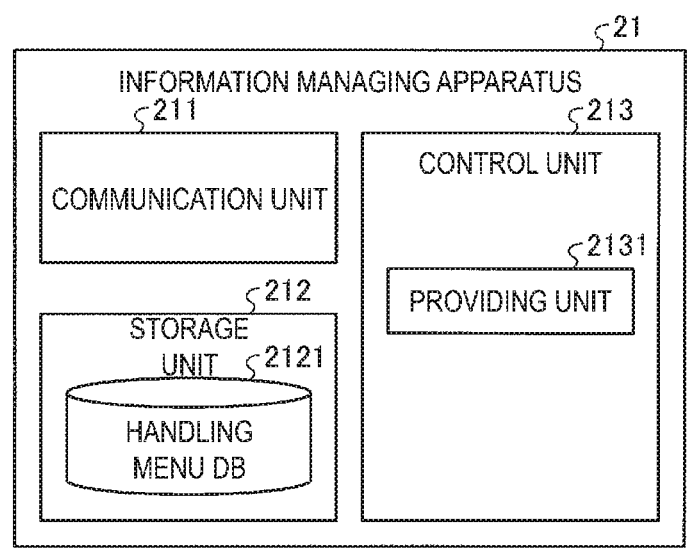
FIG. 11 is a diagram illustrating a configuration example of an information managing apparatus according to the second embodiment.

The configuration of the information managing apparatus 21 will be described using FIG. 11. FIG. 11 is a diagram illustrating a configuration example of an information managing apparatus according to the second embodiment. As illustrated in FIG. 11, the information managing apparatus 21 includes a communication unit 211, a storage unit 212, and a control unit 213.

The communication unit 211 performs data communication with other apparatuses via a network. For example, the communication unit 211 is an NIC. For example, the communication unit 211 performs data communication with the control determination apparatus 22a, the control determination apparatus 22b, and the control determination apparatus 22c.

The storage unit 212 is a storage apparatus such as an HDD, an SSD, or an optical disc. Note that the storage unit 212 may be a semiconductor memory capable of rewriting data such as a RAM, a flash memory, or an NVSRAM. The storage unit 212 stores an OS and various programs executed by the information managing apparatus 21. Furthermore, the storage unit 212 stores various kinds of information to be used in the execution of the programs. For example, the storage unit 212 stores the handling menu DB 2121.

The handling menu DB 2121 stores feasible methods of handling server attacks for each of the handling apparatuses 24 of the security systems 2S provided on the networks 2N, as described using FIG. 10.

The control unit 213 controls the information managing apparatus 21 as a whole. The control unit 213 is, for example, an electronic circuit such as a CPU or an integrated circuit such as an ASIC or an FPGA. In addition, the control unit 213 has an internal memory for storing programs defining various processing procedures and control data, and performs processes using the internal memory. Furthermore, the control unit 213 functions as various processing units by operating various programs. For example, the control unit 213 includes a providing unit 2131.

The providing unit 2131 makes a reference the handling menu DB 2121 to provide a control determination apparatus 22 with information of a network 2N capable of handling a server attack when there is a request from the control determination apparatus 22 to provide the information of the network 2N capable of handling the server attack.

Figure 12:
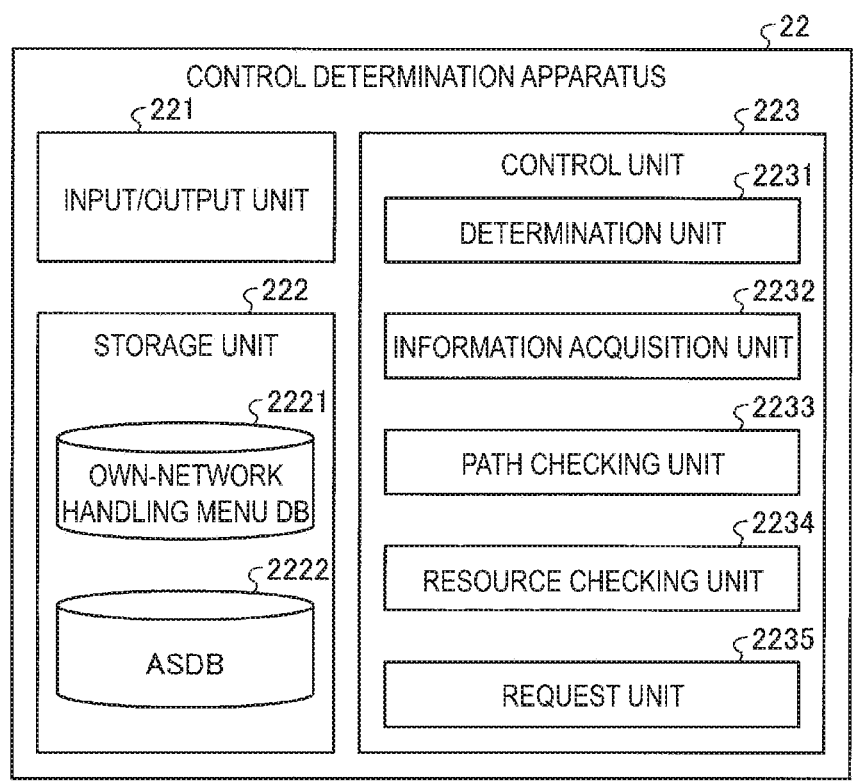
FIG. 12 is a diagram illustrating a configuration example of a control determination apparatus according to the second embodiment.

A configuration of the control determination apparatus 22 will be described using FIG. 12. FIG. 12 is a diagram illustrating a configuration example of the control determination apparatus according to the second embodiment. As illustrated in FIG. 12, the control determination apparatus 22 includes a communication unit 221, a storage unit 222, and a control unit 223.

The communication unit 221 performs data communication with other apparatuses via a network. For example, the communication unit 221 is an NIC. For example, the communication unit 221 performs data communication with the information managing apparatus 21, the control determination apparatus 22a, the control determination apparatus 22b, and the control determination apparatus 22c.

The storage unit 222 is a storage apparatus such as an HDD, an SSD, or an optical disc. Note that the storage unit 222 may be a semiconductor memory capable of rewriting data such as a RAM, a flash memory, or an NVSRAM. The storage unit 222 stores an OS and various programs executed by the control determination apparatus 22. Furthermore, the storage unit 222 stores various information used in the execution of the programs. For example, the storage unit 222 stores a own-network handling menu DB 2221 and an ASDB 2222.

The own-network handling menu DB 2221 stores methods of handling that can be performed by the handling apparatus 24 of the security system 2S itself on server attacks. For example, the own-network handling menu DB 2221 of the control determination apparatus 22a stores the same data as that corresponding to the network 2Na of the handling menu DB 2121 illustrated in FIG. 10. Moreover, a communication path between each of the networks 2N is stored in the ASDB 2222.

The control unit 223 controls the control determination apparatus 22 as a whole. The control unit 223 is, for example, an electronic circuit such as a CPU or an MPU or an integrated circuit such as an ASIC or an FPGA. In addition, the control unit 223 has an internal memory for storing programs defining various processing procedures and control data, and performs each of the processes using the internal memory. Furthermore, the control unit 223 functions as various processing units by operating various programs. For example, the control unit 223 includes a determination unit 2231, an information acquisition unit 2232, a path checking unit 2233, a resource checking unit 2234, and a request unit 2235.

The determination unit 2231 determines whether it is possible for the handling apparatus 24 to handle the first server attack taking place on the network 2N. The determination unit 2231 makes references to the own-network handling menu DB 2221 to determine whether the handling apparatus 24 of the security system 2S itself can handle the detected server attack.

Furthermore, the determination unit 2231 determines whether there is a security system 2S that can handle the server attack on the basis of information provided by the information managing apparatus 21. Note that the information provided by the information managing apparatus 21 is acquired by the information acquisition unit 2232.

The path checking unit 2233 makes reference to the ASDB 2222 to check a communication path to each of the networks 2N. The resource checking unit 2234 checks the availability of resources of the handling apparatus 24 in performing the handling of the server attack. Note that the resource checking unit 2234 may check the resources of the handling apparatus 24 of the own-network, or may check the resources of the handling apparatus 24 of another network.

The request unit 2235 makes reference to the storage unit 212, identifies another security system 2S capable of handling the first server attack and makes a request to the identified security system 2S to handle the first server attack.

The request unit 2235 makes reference to the information stored in the information managing apparatus 21, identifies another security system 2S that can handle the first server attack and makes a request to the identified security system 2S to handle the first server attack.

Specifically, in accordance of a determination of the determination unit 2231 that there is a security system 2S that can handle the server attack, when the path checking unit 2233 has checked a communication path to the security system 2S and the resource checking unit 2234 has checked that resources of the handling apparatus 24 of the security system 2S are available, the request unit 2235 makes a request to the security system 2S to handle the server attack.

As described above, in the second embodiment, the request unit 2235 makes a request to the other security systems 2S without going through other apparatuses. For example, in the example of FIG. 1, the request unit 2235 makes a request directly to the control determination apparatus 22b to handle the server attack.

On the other hand, in accordance of a determination of the determination unit 2231 that the detected server attack can be handled by the handling apparatus 24 of the corresponding security system 2S itself, when the resource checking unit 2234 has checked that the resources of the handling apparatus 24 are available, the request unit 2235 makes a request to the handling apparatus 24 to handle the server attack.

Process of Second Embodiment

Figure 13:
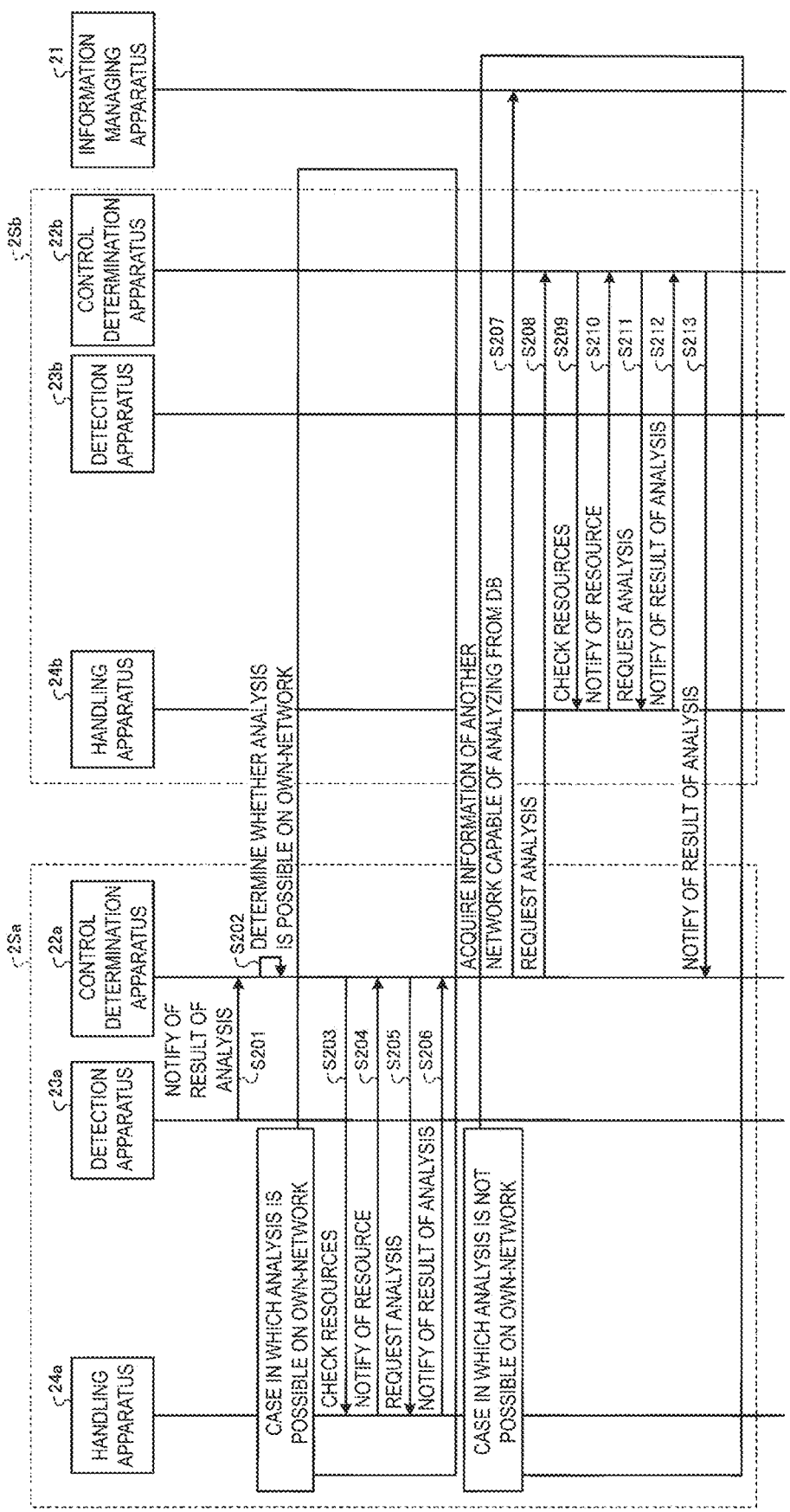
FIG. 13 is a sequence diagram illustrating a process sequence of the control system according to the second embodiment.
Figure 14:
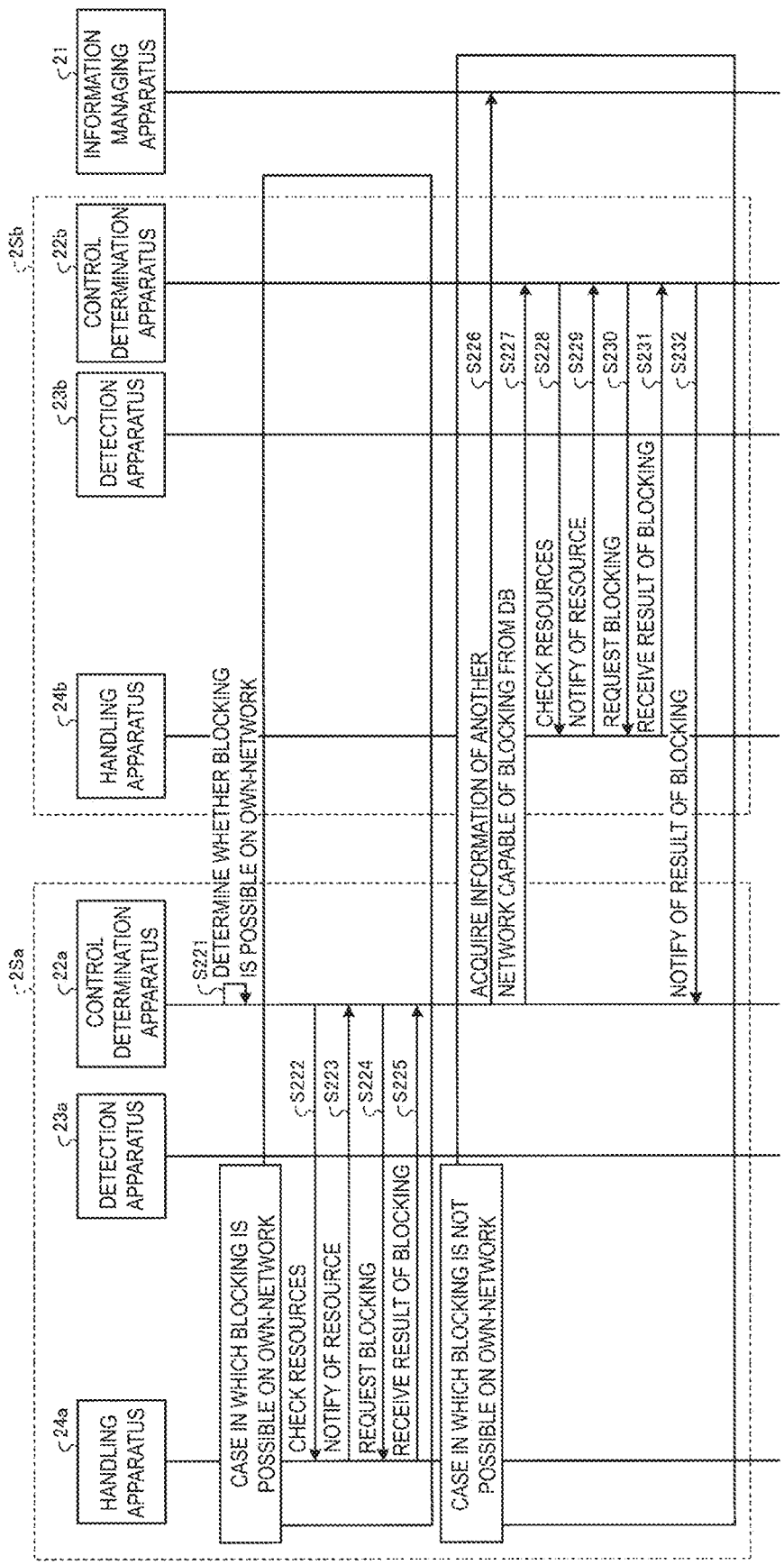
FIG. 14 is a sequence diagram illustrating a process sequence of the control system according to the second embodiment.

Overall process sequences of the control system 2 of the present embodiment will be described using FIG. 13 and FIG. 14. FIG. 13 and FIG. 14 are sequence diagrams illustrating processes of the control system according to the second embodiment.

Analysis Process (Overall)

First, an example of a case in which analysis of a server attack taking place on the network 2Na is performed will be described using FIG. 13. As illustrated in FIG. 13, when a server attack taking place on the network 2Na is detected, the detection apparatus 23a notifies the control determination apparatus 22a of the detection information (step S201). Then, the control determination apparatus 22a determines whether the server attack is analyzable on the network 2Na on the basis of the detection information (step S202).

If the server attack is analyzable on the network 2Na, the control determination apparatus 22a checks the resources of the handling apparatus 24a (step S203) and receives a notification of the resources from the handling apparatus 24a (step S204). Then, a request for analysis of the server attack is made to the handling apparatus 24a (step S205) and receives a notification of the result of analysis from the handling apparatus 24a (step S206).

On the other hand, if the server attack is not analyzable on the network 2Na, the control determination apparatus 22a acquires, from the information managing apparatus 21, information of the network 2Nb provided with the handling apparatus 24b capable of analyzing the server attack (step S207).

The control determination apparatus 22a makes a request to the control determination apparatus 22b to analyze the server attack (step S208). Then, the control determination apparatus 22b checks the resources of the handling apparatus 24b (step S209) and receives a notification of the resources from the handling apparatus 24a (step S210).

Then, the control determination apparatus 22b makes a request to the handling apparatus 24b to analyze the server attack (step S211), receives a notification of the result of analysis from the handling apparatus 24b (step S212), and notifies the control determination apparatus 22a of the received result of analysis (step S213).

Blocking Process (Overall)

Next, an example of a case in which a server attack taking place on the network 2Na is blocked will be described using FIG. 14. As illustrated in FIG. 14, the control determination apparatus 22a determines whether the server attack can be blocked on the network 2Na on the basis of the result of analysis (step S221).

If the server attack can be blocked on the network 2Na, the control determination apparatus 22a checks resources of the handling apparatus 24a (step S222) and receives a notification of the resources from the handling apparatus 24a (step S223). Thereafter, a request for blocking the server attack is made to the handling apparatus 24a (step S224) and a notification of the result of blocking is received from the handling apparatus 24a (step S225).

On the other hand, if it is not possible to block the server attack on the network 2Na, the control determination apparatus 22a acquires, from the information managing apparatus 21, information of the network 2Nb provided with the handling apparatus 24b capable of blocking the server attack (step S226).

The control determination apparatus 22a makes a request to the control determination apparatus 22b to block the server attack (step S227). Then, the control determination apparatus 22b checks the resources of the handling apparatus 24b (step S228) and receives a notification of the resources from the handling apparatus 24a (step S229).

Then, the control determination apparatus 22b makes a request to the handling apparatus 24b to block the server attack (step S230), receives a notification of the result of blocking from the handling apparatus 24b (step S231), and notifies the control determination apparatus 22a of the received result of blocking (step S232).

Analysis Process (of Each APPARATUS)

Figure 15:
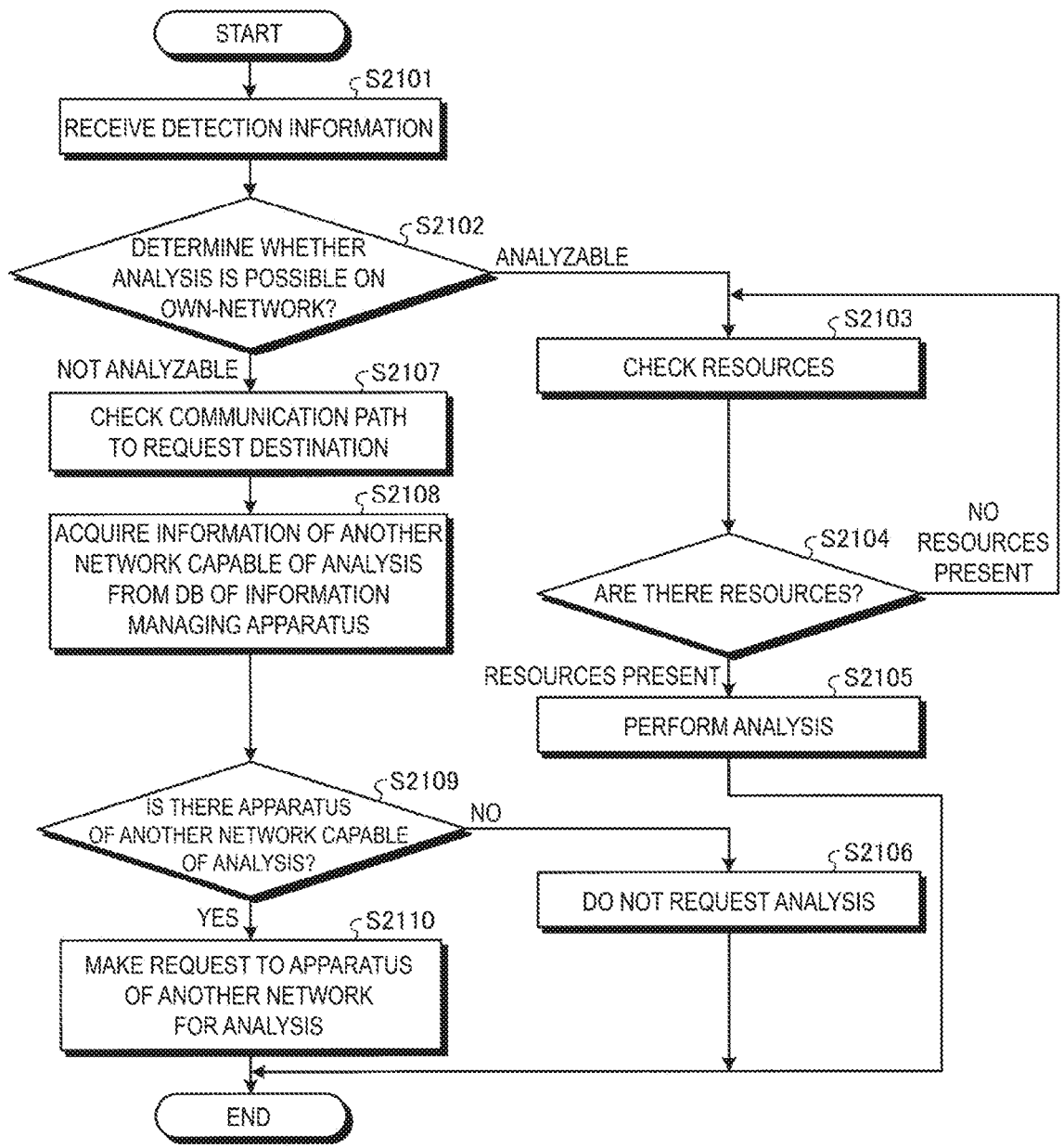
FIG. 15 is a flowchart showing an analysis process sequence of the control determination apparatus according to the second embodiment.

As illustrated in FIG. 15, the control determination apparatus 22a receives detection information on a server attack (step S2101). Next, the control determination apparatus 22a determines whether the server attack is analyzable on the network 2Na on the basis of the detection information (step S2102).

If the server attack is analyzable on the network 2Na (step S2102; analyzable), the control determination apparatus 22a checks resources of the handling apparatus 24a of the network 2Na (step S2103). If there are no resources (step S2104: no resources present), the control determination apparatus 22a checks resources again after a predetermined period of time elapses. In addition, if there is a resource (step S2104; resources present), the control determination apparatus 22a causes the handling apparatus 24a to perform analysis (step S2105).

In addition, if the server attack is not analyzable on the network 2Na (step S2102; not analyzable), the control determination apparatus 22 checks a communication path to each of the networks 2N (step S2107). Then, the control determination apparatus 22a makes reference to the DB stored in the information managing apparatus 21 to acquire information of the network 2N provided with the handling apparatus 24b capable of analyzing the server attack (step S2108).

If there is no network 2N provided with a handling apparatus 24 capable of analyzing the server attack (step S2109: NO), the control determination apparatus 22a terminates the process without requesting the analysis (step S2106).

If there is a network 2Nb provided with a handling apparatus 24b capable of analyzing the server attack (step S2109; YES), the control determination apparatus 22a makes a request the to control determination apparatus 22b of the network 2Nb for analysis (step S2110).

Figure 16:
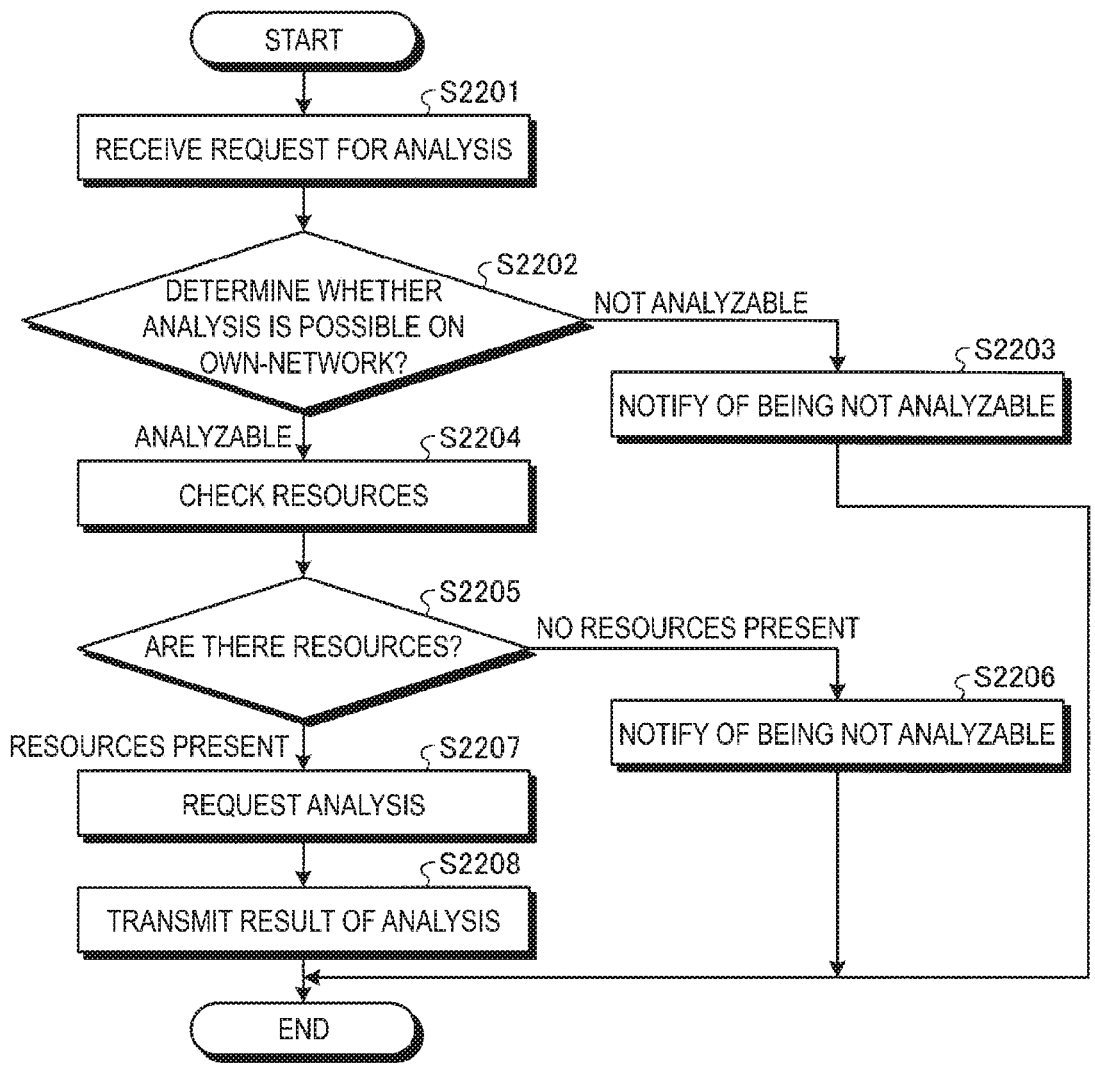
FIG. 16 is a flowchart showing an analysis process sequence of the control determination apparatus according to the second embodiment.

As shown in FIG. 16, the control determination apparatus 22b receives the analysis request for the server attack (step S2201). Next, the control determination apparatus 22b determines, on the basis of the analysis request, whether the server attack is analyzable on the network 2Nb (step S2202). If the analysis is not possible (step S2202; not analyzable), the control determination apparatus 22b notifies the control determination apparatus 22a indicating that the server attack is not analyzable and terminates the process (step S2203).

If the server attack is analyzable on the network 2Nb (step S2202; analyzable), the control determination apparatus 22a checks resources of the handling apparatus 24a of the network 2Na (step S2204). If there are no resources (step S2205: no resources), the control determination apparatus 22b notifies the control determination apparatus 22a indicating that the server attack is not analyzable and terminates the process (step S2206).

If there are resources (step S2205: resources present), the control determination apparatus 22b makes a request to the handling apparatus 24b for analysis (step S2207) and transmits the result of analysis to the control determination apparatus 22a after analysis is completed (step S2208).

Blocking Process (of Each APPARATUS)

Figure 17:
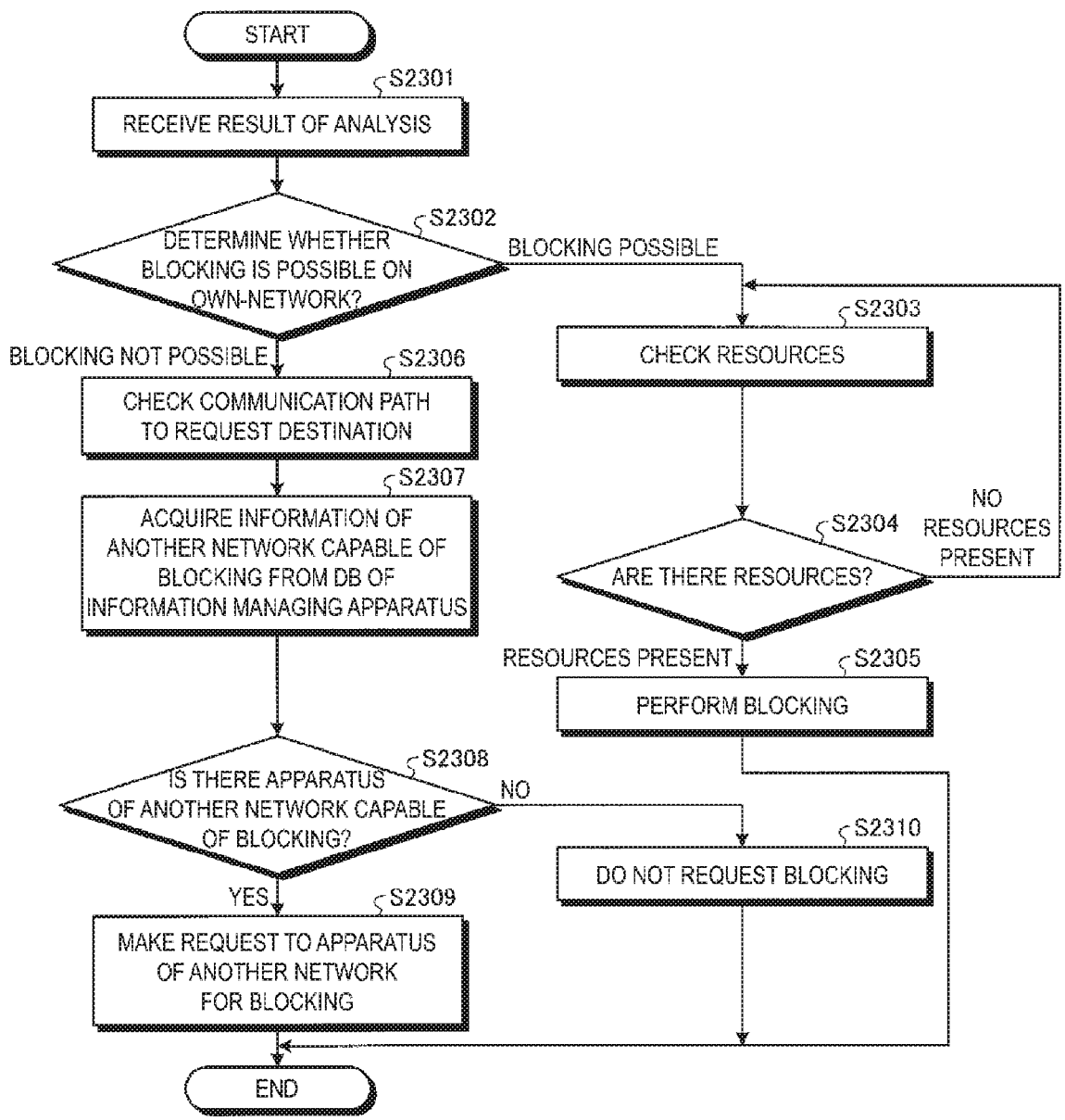
FIG. 17 is a flowchart showing a blocking process sequence of the control determination apparatus according to the second embodiment.

As shown in FIG. 17, the control determination apparatus 22a receives the result of analysis of the server attack (step S2301). Next, the control determination apparatus 22a determines whether the server attack can be blocked on the network 2Na on the basis of the result of analysis (step S2302).

If the server attack can be blocked on the network 2Na (step S2302; blocking possible), the control determination apparatus 22a checks resources of the handling apparatus 24a of the network 2Na (step S2303). If there are no resources (step S2304: no resources present), the control determination apparatus 22a checks resources again after a predetermined period of time elapses. In addition, if there are resources (step S2304; resources present), the control determination apparatus 22a causes the handling apparatus 24a to perform blocking (step S2305).

In addition, if t is not possible to block the server attack on the network 2Na (step S2302, blocking not possible), the control determination apparatus 22 checks a communication path to each of the networks 2N (step S2306). Then, the control determination apparatus 22a makes reference to the DB stored in the information managing apparatus 21 to acquire information of the network 2N provided with the handling apparatus 24b capable of blocking the server attack (step S2307).

If there is no network 2N provided with the handling apparatus 24 capable of blocking the server attack (step S2308: NO), the control determination apparatus 22a terminates the process without requesting blocking (step S2310).

If there is a network 2Nb provided with a handling apparatus 24b capable of blocking the server attack (step S2308; YES), the control determination apparatus 22a makes a request to the control determination apparatus 22b of the network 2Nb for blocking (step S2309).

Figure 18:
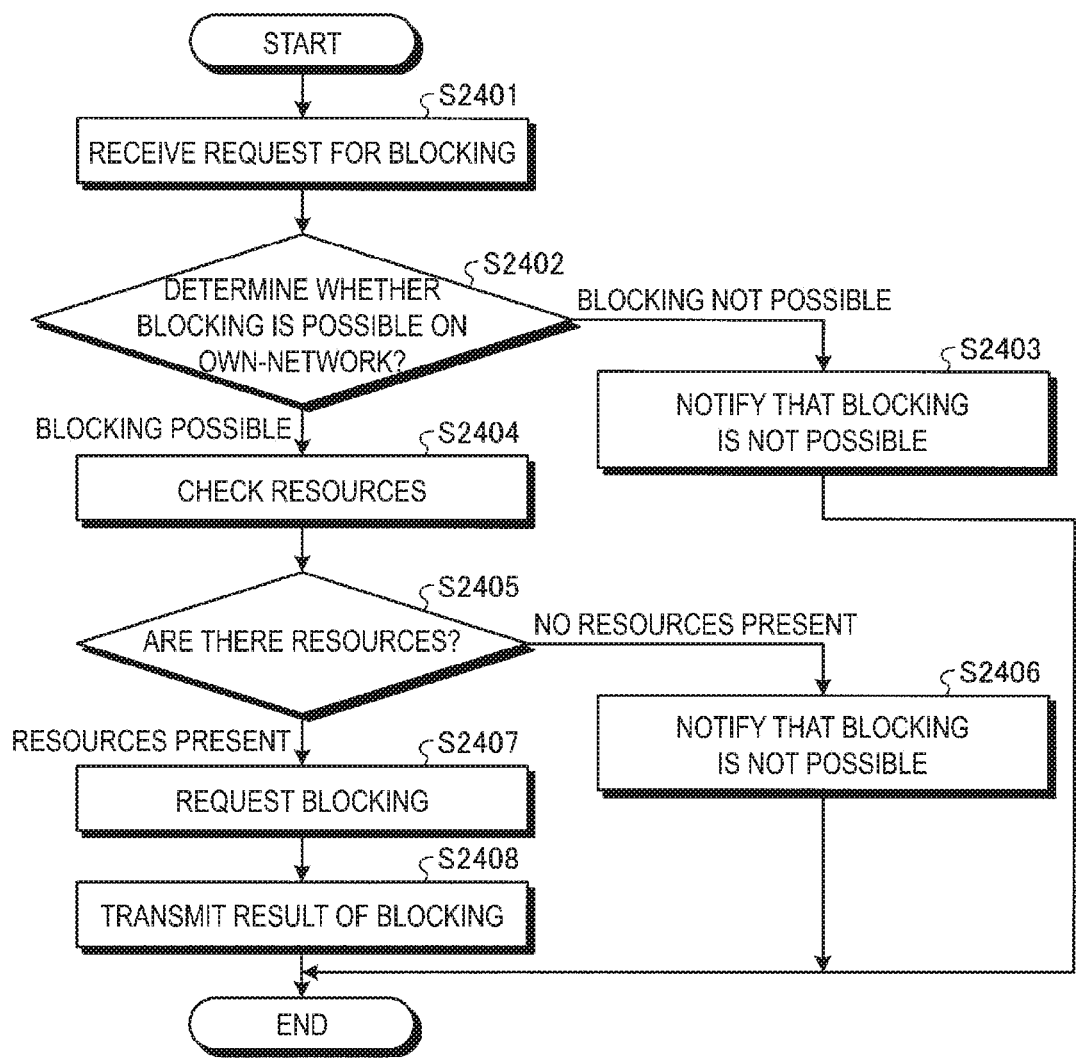
FIG. 18 is a flowchart showing a blocking process sequence of the control determination apparatus according to the second embodiment.

As shown in FIG. 18, the control determination apparatus 22b receives the request for blocking the server attack (step S2401). Next, the control determination apparatus 22b determines, on the basis of the blocking request, whether it is possible to block the server attack on the network 2Nb (step S2402). If blocking is not possible (step S2402; blocking not possible), the control determination apparatus 22b notifies the control determination apparatus 22a indicating that blocking is not possible and terminates the process (step S2403).

If it is possible to block the server attack on the network 2Nb (step S2402, blocking possible), the control determination apparatus 22a checks resources of the handling apparatus 24a of the network 2Na (step S2404). If there are no resources (step S2405: no resources present), the control determination apparatus 22b notifies the control determination apparatus 22a indicating that blocking is not possible and terminates the process (step S2406).

If there are resources (step S2405: resources present), the control determination apparatus 22b makes a request to the handling apparatus 24b for blocking (step S2407) and transmits the result of blocking to the control determination apparatus 22a after the blocking is completed (step S2408).

Effect of Second Embodiment

The storage unit 212 of the information managing apparatus 21 stores a feasible method of handling a server attack for the control determination apparatus 12 provided on each of the plurality of networks 1N. The request unit 1233 makes reference to the storage unit 212, identifies another security system 1S capable of handling the first server attack and makes a request to the specified security system 1S to handle the first server attack. Therefore, it is possible to prevent a load of processing from being concentrated on one control apparatus.

Third Embodiment

A third embodiment will be described. In the first and second embodiments, the centralized control apparatus 11 or information managing apparatus 21 stores a feasible method of handling server attacks in each security system. In contrast, in the third embodiment, each security system stores feasible methods of handling server attacks, including those of other security systems.

Furthermore, processing units of the third embodiment in similar names to those of the first embodiment basically perform similar processes to those of corresponding processing units of the first embodiment or the second embodiment. For example, a detection apparatus 33a according to the third embodiment performs similar processes to those of the detection apparatus 13a according to the first embodiment. In the following description, description of points in common between the first embodiment or the second embodiment and the third embodiment will be appropriately omitted, and differences will be described in detail.

Configuration of Third Embodiment

Figure 19:
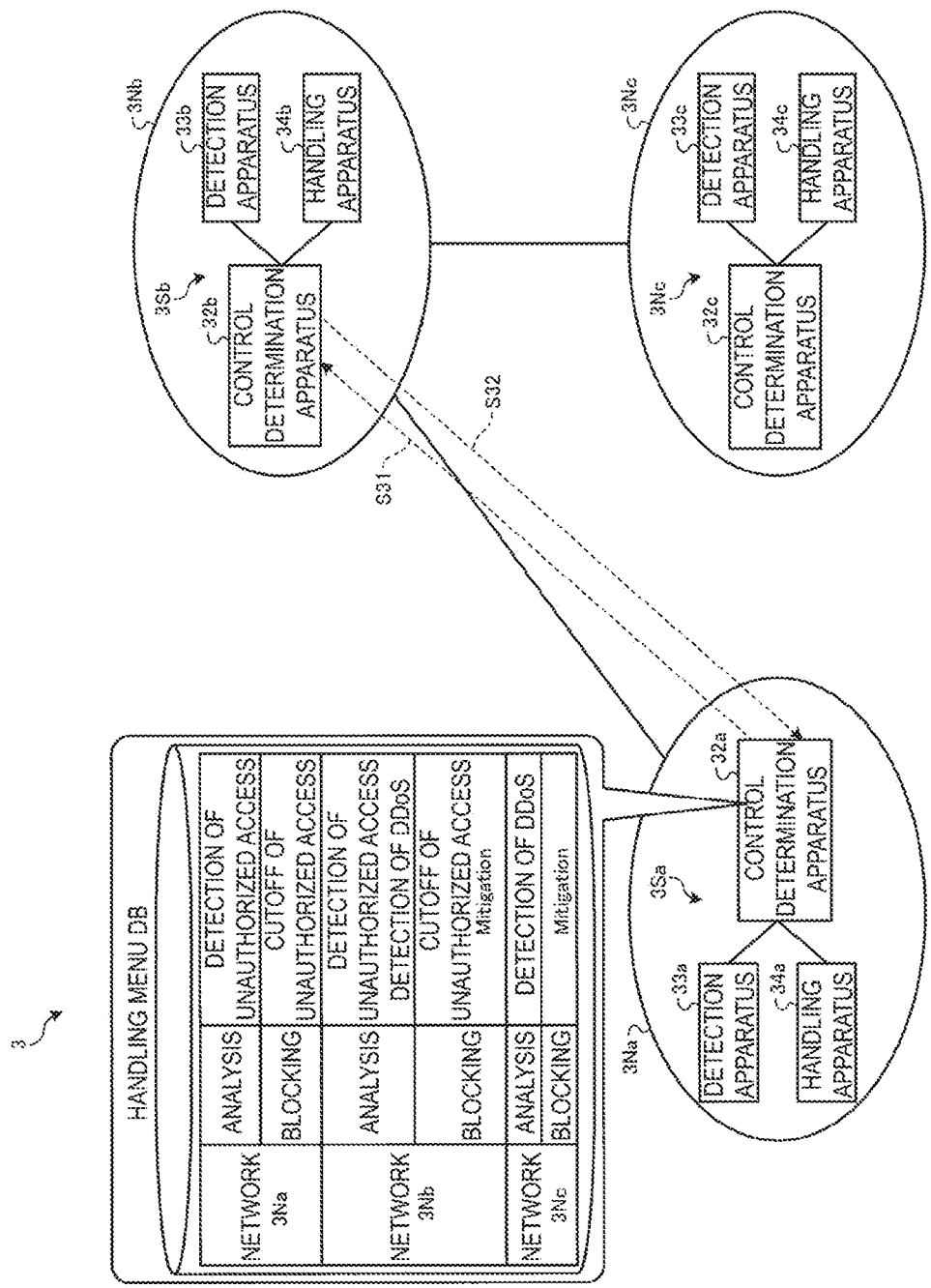
FIG. 19 is a diagram illustrating a configuration example of a control system according to a third embodiment.

First, a configuration of a control system according to the third embodiment will be described using FIG. 19. FIG. 19 is a diagram illustrating a configuration example of a control system according to the third embodiment. As illustrated in FIG. 19, the control system 3 includes a security system 3Sa provided on a network 3Na, a security system 3Sb provided on a network 3Nb, and a security system 3Sc provided on a network 3Nc.

In the following description, the network 3Na, the network 3Nb, and the network 3Nc may be referred to as networks 3N without distinction. Also, in the following description, the security system 3Sa, the security system 3Sb, and the security system 3Sc may be referred to as security systems 3S without distinction.

The security system 3Sa includes a control determination apparatus 32a, a detection apparatus 33a, and a handling apparatus 34a. In addition, the security system 3Sb includes a control determination apparatus 32b, a detection apparatus 33b, and a handling apparatus 34b. In addition, the security system 3Sc includes a control determination apparatus 32c, a detection apparatus 33c, and a handling apparatus 34c.

The control determination apparatus 32a, the control determination apparatus 32b, and the control determination apparatus 32c all have similar functions. In the following description, the control determination apparatus 32a, the control determination apparatus 32b, and the control determination apparatus 32c may be referred to as control determination apparatuses 32 without distinction. In addition, the detection apparatus 33a, the detection apparatus 33b, and the detection apparatus 33c all have similar functions. In the following description, the detection apparatus 33a, the detection apparatus 33b, and the detection apparatus 33c may be referred to as detection apparatuses 33 without distinction. In addition, the handling apparatus 34a, the handling apparatus 34b, and the handling apparatus 34c all have similar functions. In the following description, the handling apparatus 34a, the handling apparatus 34b, and the handling apparatus 34c may be referred to as handling apparatuses 34 without distinction.

The detection apparatuses 33 and the handling apparatuses 34 perform similar processes to those of the detection apparatuses 13 and the handling apparatuses 14 of the third embodiment. In addition, the handling apparatus 34a, the handling apparatus 34b, and the handling apparatus 34c are similar to those of the third embodiment in that feasible methods of handling the server attacks differ.

The control determination apparatus 32a has a handling menu DB 3221. Similar to the handling menu DB 2121 of the first embodiment, the handling menu DB 3221 stores feasible methods of handling server attacks for each of the handling apparatuses 34 of the security system 3S provided on the network 3N.

Here, an overview of processing of the control system 3 will be described. First, the detection apparatus 33a of the security system 3Sa detects a server attack on the network 3Na. Then, in accordance of a determination of the control determination apparatus 32a that the server attack is not possible to be handled by the handling apparatus 34a, the control determination apparatus 32a makes reference to the handling menu DB 3221 to extract the security system 3Sb capable of handling the server attack and makes a request to the security system 3Sb to handle the server attack (step S31). The security system 3Sb handles the server attack and notifies the control determination apparatus 32a of the result of handling (step S32).

Figure 20:
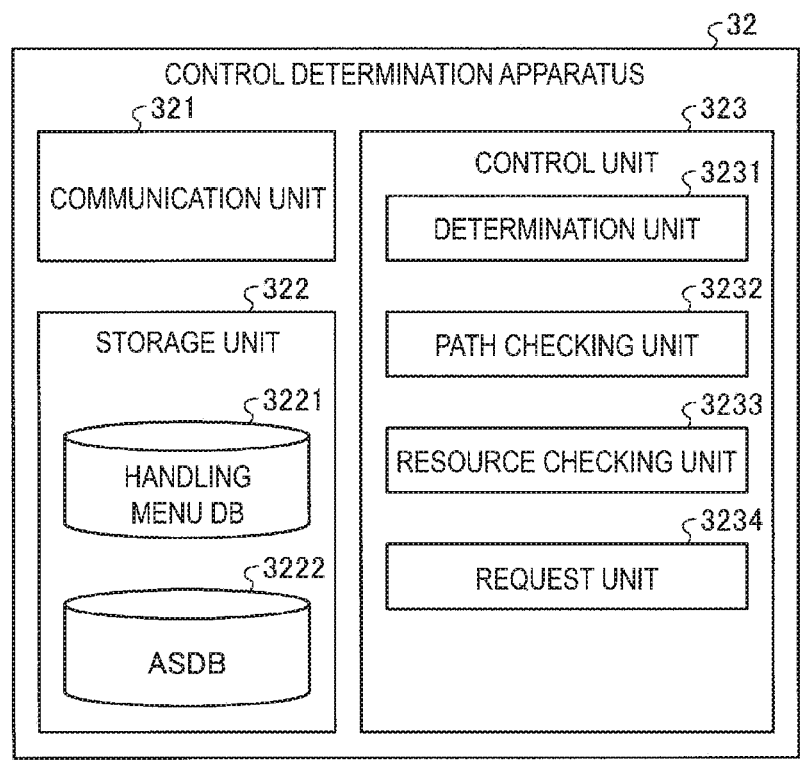
FIG. 20 is a diagram illustrating a configuration example of a control determination apparatus according to the third embodiment.

A configuration of the control determination apparatus 32 will be described using FIG. 20. FIG. 20 is a diagram illustrating a configuration example of the control determination apparatus according to the third embodiment. As illustrated in FIG. 20, the control determination apparatus 32 includes a communication unit 321, a storage unit 322, and a control unit 323.

The communication unit 321 performs data communication with other apparatuses via a network. For example, the communication unit 321 is an NIC. For example, the communication unit 321 performs data communication with the control determination apparatus 32a, the control determination apparatus 32b, and the control determination apparatus 32c.

The storage unit 322 is a storage apparatus such as an HDD, an SSD, or an optical disc. Note that the storage unit 322 may be a semiconductor memory capable of rewriting data such as a RAM, a flash memory, or an NVSRAM. The storage unit 322 stores an OS and various programs executed by the control determination apparatus 32. Furthermore, the storage unit 322 stores various information used in the execution of the programs. For example, the storage unit 322 stores the handling menu DB 3221 and an ASDB 3222.

The handling menu DB 3221 stores feasible methods of handling server attacks for each of the handling apparatuses 34 of the security systems 3S provided on the networks 3N, as described using FIG. 19. Moreover, a communication path between each of the networks 3N is stored in the ASDB 3222.

The control unit 323 controls the control determination apparatus 32 as a whole. The control unit 323 is, for example, an electronic circuit such as a CPU or an MPU or an integrated circuit such as an ASIC or an FPGA. In addition, the control unit 323 has an internal memory for storing programs defining various processing procedures and control data, and performs each of the processes using the internal memory. Furthermore, the control unit 323 functions as various processing units by operating various programs. For example, the control unit 323 includes a determination unit 3231, a path checking unit 3232, a resource checking unit 3233, and a request unit 3234.

The determination unit 3231 determines whether it is possible for the handling apparatus 34 to handle the first server attack taking place on the network 3N. The determination unit 3231 makes reference to the handling menu DB 3221 to determine whether the handling apparatus 34 of the security system 3S itself can handle the detected server attack. In addition, the determination unit 3231 makes reference to the handling menu DB 3221 to determine whether there is a security system 3S that can handle the server attack.

The path checking unit 3232 makes reference to the ASDB 3222 to check a communication path to each of the networks 3N. The resource checking unit 3233 checks the availability of resources of the handling apparatus 34 in performing the handling of the server attack. Note that the resource checking unit 3233 may check the resources of the handling apparatus 34 of the own-network, or may check resources of the handling apparatus 34 of another network.

The request unit 3234 makes reference to the storage unit 322, identifies another security system 3S capable of handling the first server attack and makes a request to the identified security system 3S to handle the first server attack.

The request unit 3234 makes reference to information stored in the storage unit 322, identifies another security system 3S capable of handling the first server attack and makes a request to the identified security system 3S to handle the first server attack.

Specifically, in accordance with a determination of the determination unit 3231 that there is a security system 3S that can handle the server attack, when the path checking unit 3232 has checked a communication path to the security system 3S and the resource checking unit 3233 has checked that resources of the handling apparatus 34 of the security system 3S are available, the request unit 3234 makes a request to the security system 3S to handle the server attack.

Thus, in the third embodiment, the control determination apparatus 32 makes a request to another security system 3S without making reference to the DB of the other apparatus and without going through the other apparatus. For example, in the example of FIG. 19, the request unit 3234 makes a request directly to the control determination apparatus 32b to handle the server attack.

On the other hand, in accordance with a determination of the determination unit 3231 that the detected server attack can be handled by the handling apparatus 34 of the security system 3S itself, when the resource checking unit 3233 has checked that the resources of the handling apparatus 34 are available, the request unit 3234 makes a request to the handling apparatus 34 to handle the server attack.

Process of Third Embodiment

Figure 21:
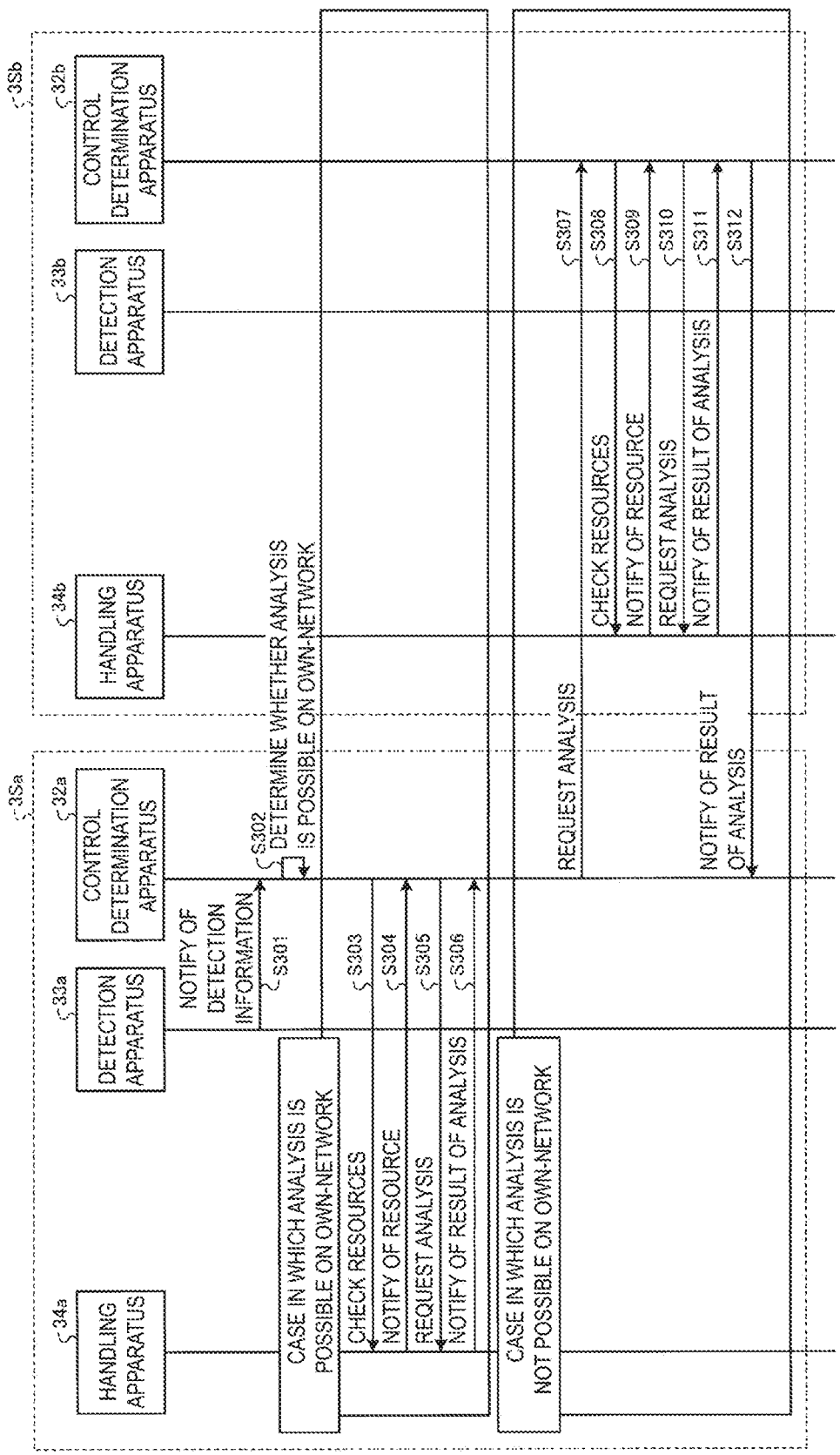
FIG. 21 is a sequence diagram illustrating a process sequence of the control system according to the third embodiment.
Figure 22:
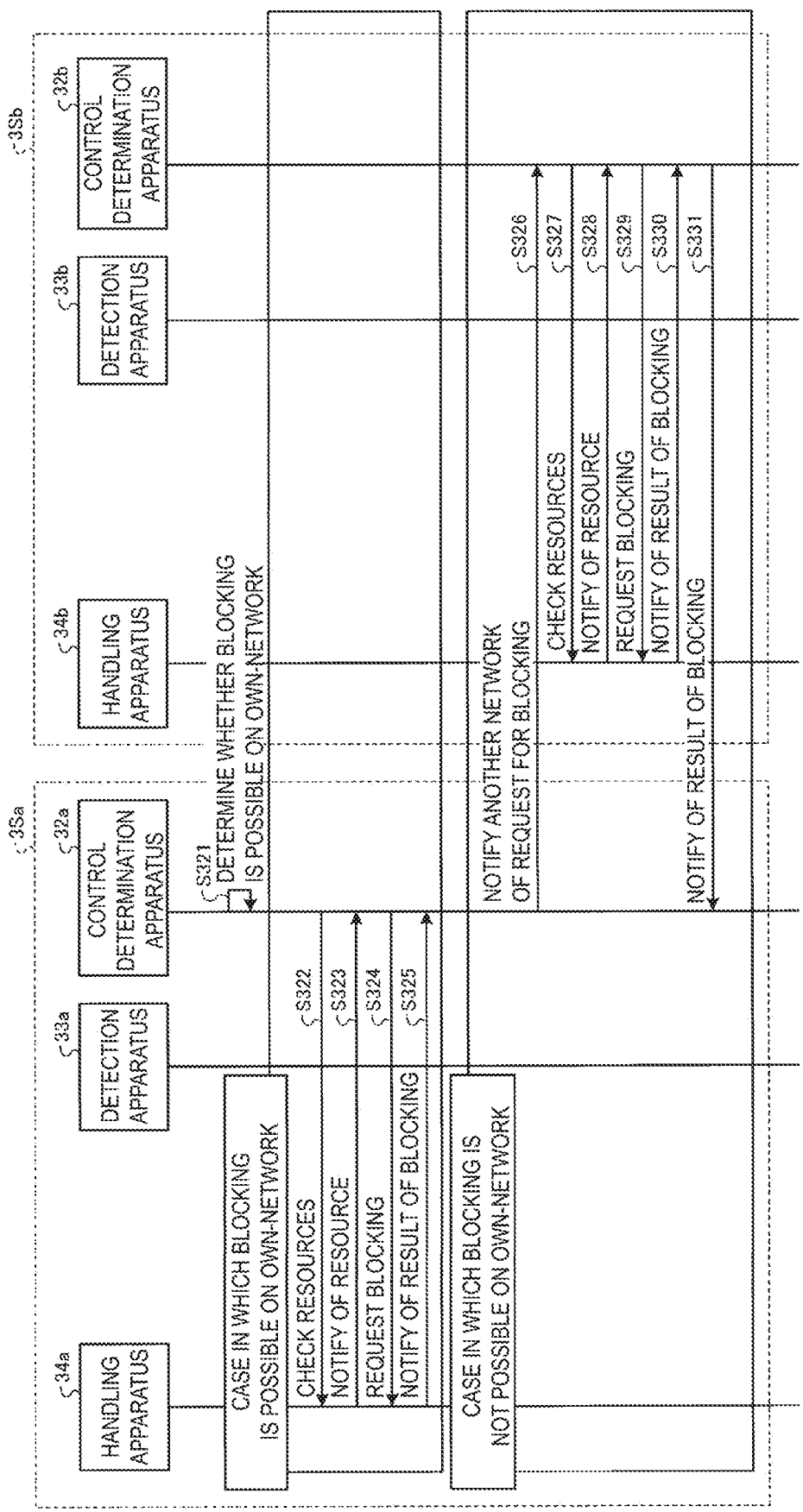
FIG. 22 is a sequence diagram illustrating a process sequence of the control system according to the third embodiment.

Overall process sequences of the control system 3 of the present embodiment will be described using FIG. 21 and FIG. 22. FIG. 21 and FIG. 22 are sequence diagrams illustrating processes of the control system according to the third embodiment.

Analysis Process (Overall)

First, an example of a case in which analysis of a server attack taking place on the network 3Na is performed will be described using FIG. 21. As illustrated in FIG. 21, when a server attack taking place on the network 3Na is detected, the detection apparatus 33a notifies the control determination apparatus 32a of the detection information (step S301). Then, the control determination apparatus 32a determines whether the server attack is analyzable on the network 3Na on the basis of the detection information (step S302).

If the server attack is analyzable on the network 3Na, the control determination apparatus 32a checks resources of the handling apparatus 34a (step S303) and receives a notification of the resources from the handling apparatus 34a (step S304). Then, a request for analysis of the server attack is made to the handling apparatus 34a (step S305) and receives a notification of the result of analysis from the handling apparatus 34a (step S306).

On the other hand, if the server attack is not analyzable on the network 3Na, the control determination apparatus 32a makes reference to the DB stored by the control determination apparatus 32a to acquire information of the network 3Nb provided with the handling apparatus 34b capable of analyzing the server attack, and makes a request to the control determination apparatus 32b to analyze the server attack (step S307). Then, the control determination apparatus 32b checks resources of the handling apparatus 34b (step S308) and receives a notification of the resources from the handling apparatus 34a (step S309).

Then, the control determination apparatus 32b makes a request to the handling apparatus 34b to analyze the server attack (step S310), receives a notification of the result of analysis from the handling apparatus 34b (step S311), and notifies the control determination apparatus 32a of the received result of analysis (step S312).

Blocking Process (Overall)

Next, an example of a case in which a server attack taking place on the network 3Na is blocked will be described using FIG. 22. As illustrated in FIG. 22, the control determination apparatus 32a determines whether the server attack can be blocked on the network 3Na on the basis of the result of the analysis (step S321).

If the server attack can be blocked on the network 3Na, the control determination apparatus 32a checks resources of the handling apparatus 34a (step S322) and receives a notification of the resources from the handling apparatus 34a (step S323). Thereafter, a request for blocking the server attack is made to the handling apparatus 34a (step S324) and a notification of the result of blocking is received from the handling apparatus 34a (step S325).

On the other hand, if it is not possible to block the server attack on the network 3Na, the control determination apparatus 32a makes reference to the DB stored by the control determination apparatus 32a to acquire information of the network 3Nb provided with the handling apparatus 34b capable of blocking the server attack, and makes a request to the control determination apparatus 32b to block the server attack (step S326). Then, the control determination apparatus 32b checks the resources of the handling apparatus 34b (step S327) and receives a notification of the resources from the handling apparatus 34a (step S328).

Then, the control determination apparatus 32b makes a request to the handling apparatus 34b to block the server attack (step S329), receives a notification of the result of blocking from the handling apparatus 34b (step S330), and notifies the control determination apparatus 32a of the received result of blocking (step S331).

Analysis Process (of Each APPARATUS)

Figure 23:
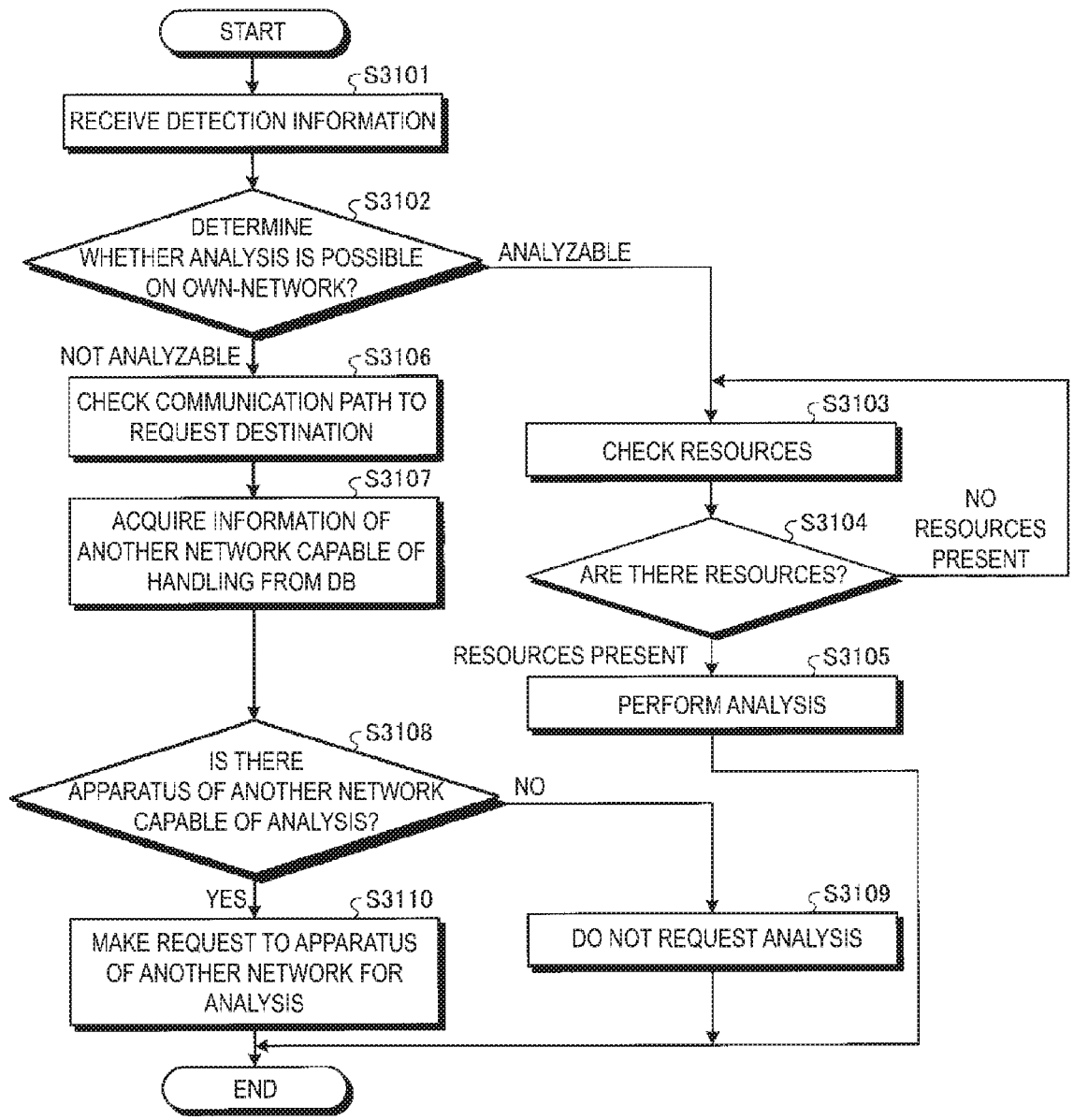
FIG. 23 is a flowchart showing an analysis process sequence of the control determination apparatus according to the third embodiment.

As illustrated in FIG. 23, the control determination apparatus 32a receives detection information on a server attack (step S3101). Next, the control determination apparatus 32a determines whether the server attack is analyzable on the network 3Na on the basis of the detection information (step S3102).

If the server attack is analyzable on the network 3Na (step S3102; analyzable), the control determination apparatus 32a checks resources of the handling apparatus 34a of the network 3Na (step S3103). If there are no resources (step S3104: no resources present), the control determination apparatus 32a checks resources again after a predetermined period of time elapses. In addition, if there is a resource (step S3104: resources present), the control determination apparatus 32a causes the handling apparatus 34a to perform analysis (step S3105).

In addition, if the server attack is not analyzable on the network 3Na (step S3102; not analyzable), the control determination apparatus 32 checks a communication path to each of the networks 3N (step S3106). Then, the control determination apparatus 32a makes reference to the DB stored in the control determination apparatus 32a to acquire information of the network 3N provided with the handling apparatus 34b capable of analyzing the server attack (step S3107).

If there is no network 3N provided with a handling apparatus 34 capable of analyzing the server attack (step S3108; NO), the control determination apparatus 32a terminates the process without requesting the analysis (step S3109).

If there is the network 3Nb provided with a handling apparatus 34b capable of analyzing the server attacks (step S3108; YES), the control determination apparatus 32a makes a request the to control determination apparatus 32b of the network 3Nb for analysis (step S3110).

Blocking Process (of Each APPARATUS)

Figure 24:
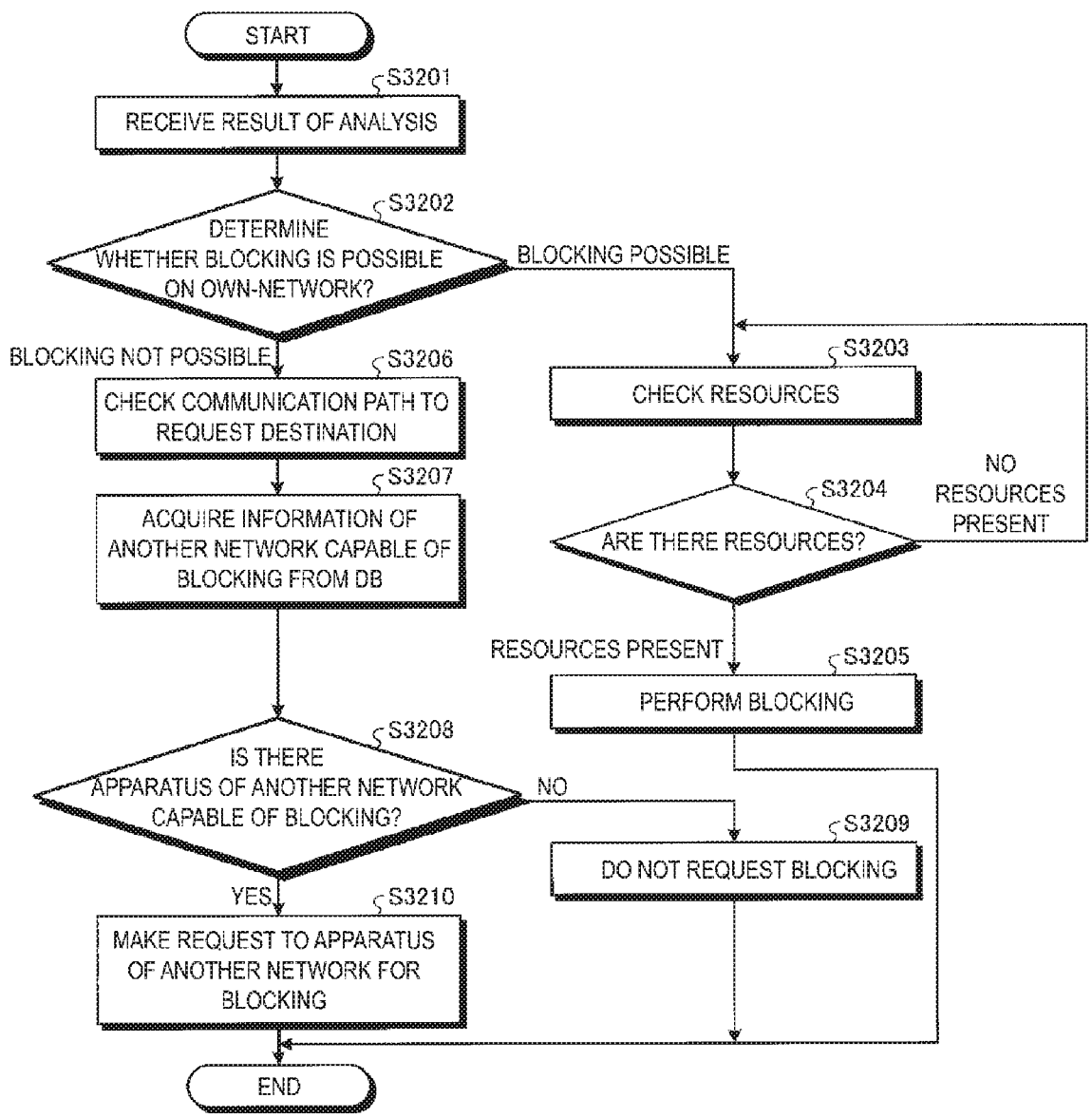
FIG. 24 is a flowchart showing a blocking process sequence of the control determination apparatus according to the third embodiment.

As shown in FIG. 24, the control determination apparatus 32a receives the result of analysis of the server attack (step S3201). Next, the control determination apparatus 32a determines whether the server attack can be blocked on the network 3Na on the basis of the result of analysis (step S3202).

If the server attack can be blocked on the network 3Na (step S3202; blocking possible), the control determination apparatus 32a checks resources of the handling apparatus 34a of the network 3Na (step S3203). If there are no resources (step S3204; no resources present), the control determination apparatus 32a checks resources again after a predetermined period of time elapses. In addition, if there a resource (step S3204; resources present), the control determination apparatus 32a causes the handling apparatus 34a to perform blocking (step S3205).

In addition, if it is not possible to block the server attack on the network 3Na (step S3202; blocking not possible), the control determination apparatus 32 checks a communication path to each of the networks 3N (step S3206). Then, the control determination apparatus 32a makes reference to the DB stored in the control determination apparatus 32a to acquire information of the network 3N provided with the handling apparatus 34b capable of blocking the server attack (step S3207).

If there is no network 3N provided with the handling apparatus 34 capable of blocking the server attack (step S3208: NO), the control determination apparatus 32a terminates the process without requesting blocking (step S3209).

If there is the network 3Nb provided with a handling apparatus 34b capable of blocking the server attack (step S3208; YES), the control determination apparatus 32a makes a request the to control determination apparatus 32b of the network 3Nb for blocking (step S3210).

Effect of Third Embodiment

The storage unit 322 of the control determination apparatus 32 stores a feasible method of handling a server attack on each control determination apparatus 32 provided on each of the plurality of networks 1N. A control system 1 according to claim 1 wherein the request unit 3234 makes reference to the storage unit 322, identifies another security system 3S capable of handling the first server attack and makes a request to the identified security system 3S to handle the first server attack. Thus, each security system can request handling of a server attack without referring to an external apparatus.

Program

As an embodiment, each apparatus of the control systems 1 to 3 can be implemented by installing a control program that executes the above-described communication control in a desired computer as package software or online software. For example, each communication device such as a gateway apparatus is included in a way that the above-described control program is executed on the information processing apparatus.

Figure 25:
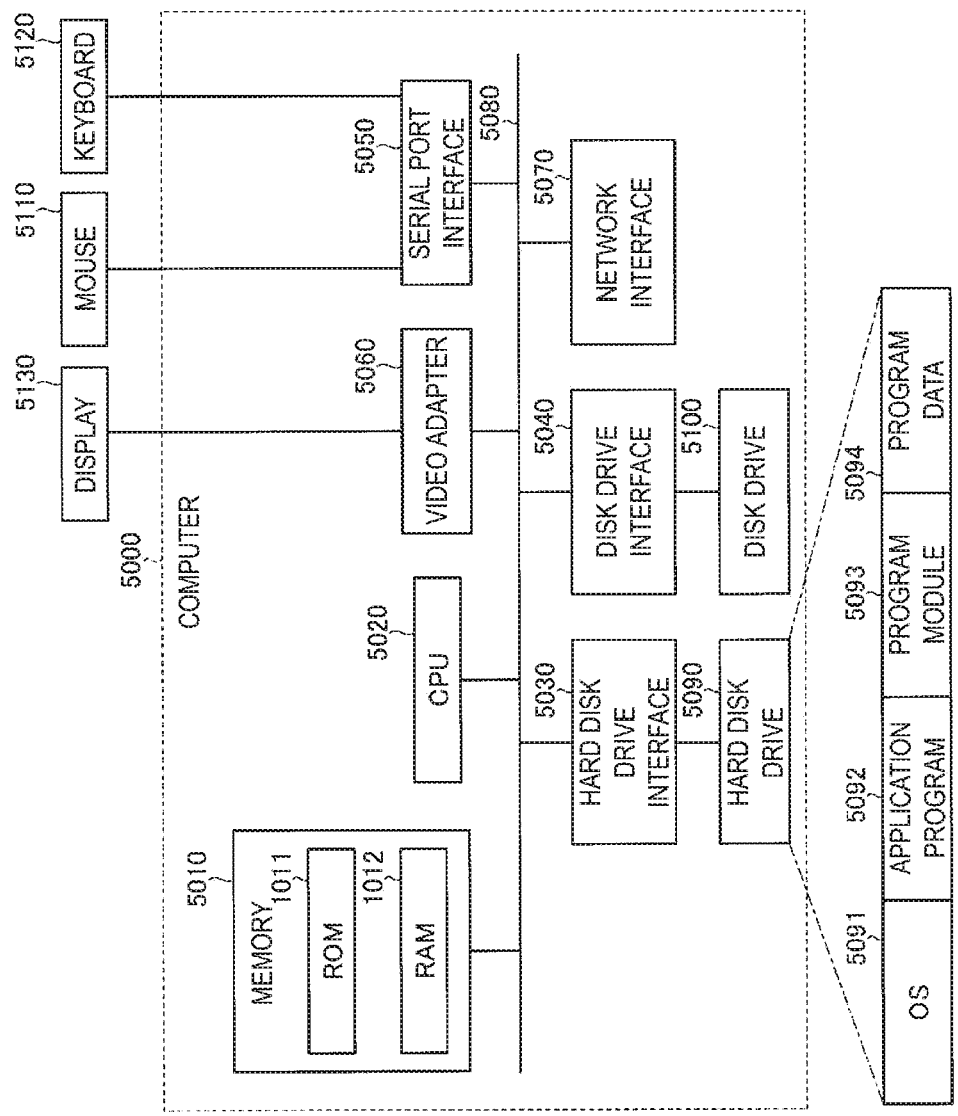
FIG. 25 is a diagram illustrating an example of a computer that functions as a control determination apparatus according to an embodiment.

FIG. 25 is a diagram illustrating an example of a computer that functions as a control determination apparatus according to an embodiment. The computer 5000 includes, for example, a memory 5010 and a CPU 5020. In addition, the computer 5000 includes a hard disk drive interface 5030, a disk drive interface 5040, a serial port interface 5050, a video adapter 5060, and a network interface 5070. Each of these units is connected by a bus 5080.

The memory 5010 includes a read only memory (ROM) 5011 and a RAM 5012. The ROM 5011 stores a boot program, for example, a basic input/output system (BIOS). The hard disk drive interface 5030 is connected to a hard disk drive 5090. The disk drive interface 5040 is connected to a disk drive 5100. A removable storage medium, for example, a magnetic disk or an optical disc, is inserted into the disk drive 5100. The serial port interface 5050 is connected to, for example, a mouse 5110 and a keyboard 5120. The video adapter 5060 is connected to a display 5130, for example.

The hard disk drive 5090 stores an OS 5091, an application program 5092, a program module 5093, and program data 5094, for example. That is, the program defining each process of the control determination apparatus is implemented as the program module 5093 in which computer-executable codes are described. The program module 5093 is stored in, for example, the hard disk drive 5090. For example, the program module 5093 for performing processes similar to those of the functional configuration of the control determination apparatus is stored in the hard disk drive 1090. Note that the hard disk drive 5090 may be replaced by an SSD.

In addition, the set data used in the processes of the above-described embodiments is stored as the program data 5094 in, for example, the memory 5010 and the hard disk drive 5090. Furthermore, the CPU 5020 reads the program module 5093 and the program data 5094 stored in the memory 5010 and the hard disk drive 5090 in the RAM 5012 as necessary and executes the processes of the above-described embodiments.

Note that the program module 5093 and the program data 5094 are not limited to being stored in the hard disk drive 5090, and may be stored in, for example, a removable storage medium, and read by the CPU 5020 via the disk drive 5100 or the like. Alternatively, the program module 5093 and the program data 5094 may be stored in another computer connected via a network (a local area network (LAN)), a wide area network (WAN), etc.). Then, the program module 5093 and the program data 5094 may be read by the CPU 5020 from the other computer via the network interface 5070.

REFERENCE SIGNS LIST 1, 2, 3 Control system
11 Centralized control apparatus
12, 22, 32 Control determination apparatus
13, 23, 33 Detection apparatus
14, 24, 34 Handling apparatus
1N, 2N, 3N Network
1S, 2S, 3S Security system
21 Information managing apparatus
111, 121, 211, 221, 321 Communication unit
112, 122, 212, 222, 322 Storage unit
113, 123, 213, 223, 323 Control unit
1121, 2121, 3221 Handling menu DB
1122, 2222, 3222 ASDB
1131, 2233, 3232 Path checking unit
1132, 1231, 2231, 3231 Determination unit
1133, 1232, 2234, 3233 Resource checking unit
1134 Proxy request unit
1221, 2221 Own-network handling menu DB
1233, 2235, 3234 Request unit
2131 Providing unit
2232 Information acquisition unit

The invention claimed is:

1. A control system comprising a plurality of networks, wherein a first security system provided on a first network among the plurality of networks includes:
a handling unit, implemented using one or more computing devices, configured to handle a server attack taking place on the first network, the handling being requested by a second security system provided on a second network among the plurality of networks;
a determination unit, implemented using one or more computing devices, configured to determine whether the handling unit is able to handle a first server attack taking place on the first network; and
a request unit, implemented using one or more computing devices, configured to, in accordance with a determination of the determination unit that the handling unit is not able to handle the first server attack, request to a third security system that is provided on a third network among the plurality of networks and that is able to handle the first server attack to handle the first server attack.

2. The control system according to claim 1, further comprising:
a centralized control apparatus including:
a storage configured to store, for a control determination apparatus provided on each of the plurality of networks, a method of handling a server attack; and
a proxy request unit, implemented using one or more computing devices, configured to:
receive a request from made by the request unit,
reference to the storage,
identify the third security system for handling the first server attack, and
request to the identified third security system to handle the first server attack.

3. The control system according to claim 1, further comprising:
an information managing apparatus including:
a storage configured to store a method of handling a server attack for a control determination apparatus provided on each of the plurality of networks,
wherein the request unit is configured to:
reference makes reference to the storage,
identify the third security system for handling the first server attack, and
request to the identified third security system to handle the first server attack.

4. The control system according to claim 1, wherein the first security system further includes:
a storage configured to store a method of handling a server attack for a control determination apparatus provided on each of the plurality of networks, and
wherein the request unit is configured to:
reference to the storage,
identify the third security system for handling the first server attack, and
request to the identified third security system to handle the first server attack.

5. A first control determination apparatus provided on a first network included in a control system including a plurality of networks, the first control determination apparatus comprising:
a handling unit, implemented using one or more computing devices, configured to handle a server attack taking place on the first network, the handling being requested by a second control determination apparatus provided on a second network among the plurality of networks;
a determination unit, implemented using one or more computing devices, configured to determine whether the handling unit is able to handle a first server attack taking place on the first network; and
a request unit, implemented using one or more computing devices, configured to, in accordance with a determination of the determination unit that the handling unit is not able to handle the first server attack, reference to a storage configured to store a method of handling a server attack for a control determination apparatus provided on each of the plurality of networks, identify a third control determination apparatus that is provided on a third network among the plurality of networks and that is able to handle the first server attack, and request to the identified third control determination apparatus to handle the first server attack.

6. The first control determination apparatus according to claim 5, wherein the control system further comprises:
a centralized control apparatus including:
a storage configured to store a method of handling a server attack; and
a proxy request unit, implemented using one or more computing devices, configured to:
receive a request from the request unit,
reference to the storage,
identify the third control determination apparatus for handling the first server attack, and
request to the identified third control determination apparatus to handle the first server attack.

7. The first control determination apparatus according to claim 5, wherein the control system further comprises:
an information managing apparatus including:
a storage configured to store a method of handling a server attack,
wherein the request unit is configured to:
reference to the storage,
identify the third control determination apparatus for handling the first server attack, and
request to the identified third control determination apparatus to handle the first server attack.

8. A control method performed in a control system including a plurality of networks, the control method comprising:
determining, by a first security system provided on a first network among the plurality of networks, the first security system including a handling unit configured to handle a server attack taking place on the first network, the handling being requested by a second security system provided on a second network among the plurality of networks, whether the handling unit is able to handle a first server attack taking place on the first network; and requesting, in accordance with a determination of the first security system that the handling unit is not able to handle the first server attack, to a third security system that is provided on a third network among the plurality of networks and that is able to handle the first server attack to handle the first server attack.

\* \* \* \* \*